US008769466B2

(12) United States Patent
Baba

(10) Patent No.: US 8,769,466 B2
(45) Date of Patent: Jul. 1, 2014

(54) IMPLEMENTATION DESIGN SUPPORT METHOD AND APPARATUS

(75) Inventor: Yuji Baba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 13/427,945

(22) Filed: Mar. 23, 2012

(65) Prior Publication Data
US 2012/0254821 A1 Oct. 4, 2012

(30) Foreign Application Priority Data
Mar. 30, 2011 (JP) ................................. 2011-076095

(51) Int. Cl.
G06F 17/50 (2006.01)
(52) U.S. Cl.
USPC ........... 716/122; 716/100; 716/109; 716/110; 716/112; 716/113; 716/129; 716/136
(58) Field of Classification Search
USPC ........... 716/100, 109, 110, 112, 13, 122, 129, 716/136
See application file for complete search history.

(56) References Cited

U.S. PATENT DOCUMENTS

| 5,740,341 | A | * | 4/1998 | Oota et al. ..................... 345/420 |
| 6,052,516 | A |   | 4/2000 | Tajima |
| 6,578,184 | B2 | * | 6/2003 | Fukuda et al. ................. 716/129 |
| 6,772,403 | B1 | * | 8/2004 | Sasaki ........................... 716/113 |
| 6,938,231 | B2 | * | 8/2005 | Yoshida et al. ................ 716/113 |
| 7,398,497 | B2 | * | 7/2008 | Sato et al. ...................... 716/112 |
| 7,444,612 | B2 | * | 10/2008 | Ariyama et al. ............... 716/100 |
| 7,904,843 | B2 | * | 3/2011 | Matsuda et al. ............... 716/136 |
| 8,271,921 | B2 | * | 9/2012 | Nitta et al. .................... 716/110 |
| 8,302,066 | B2 | * | 10/2012 | Kishi ............................ 716/136 |
| 8,316,337 | B2 | * | 11/2012 | Bhattacharya et al. ........ 716/122 |
| 2009/0300568 | A1 | * | 12/2009 | Kuroda ........................... 716/10 |

FOREIGN PATENT DOCUMENTS

| JP | 5-290125 | 11/1993 |
| JP | 7-262233 | 10/1995 |
| JP | 10-124558 | 5/1998 |

* cited by examiner

Primary Examiner — Helen Rossoshek
(74) Attorney, Agent, or Firm — Fujitsu Patent Center

(57) ABSTRACT

The disclosed method includes: identifying a first reference component from among first components defined in a first constraint condition that is a reference designated from among constraint conditions regarding a position relationship between plural components on a printed circuit board; identifying a second reference component from among second components defined in a second constraint condition that is to be compared with the first constraint condition and included in the constraint conditions; and identifying a fourth component that is a component other than the second reference component among the second components and has a correspondence with a third component, based on position relationships with the third component and an attribute of the third component, wherein the third component is a component other than the first reference component among the first components.

9 Claims, 20 Drawing Sheets

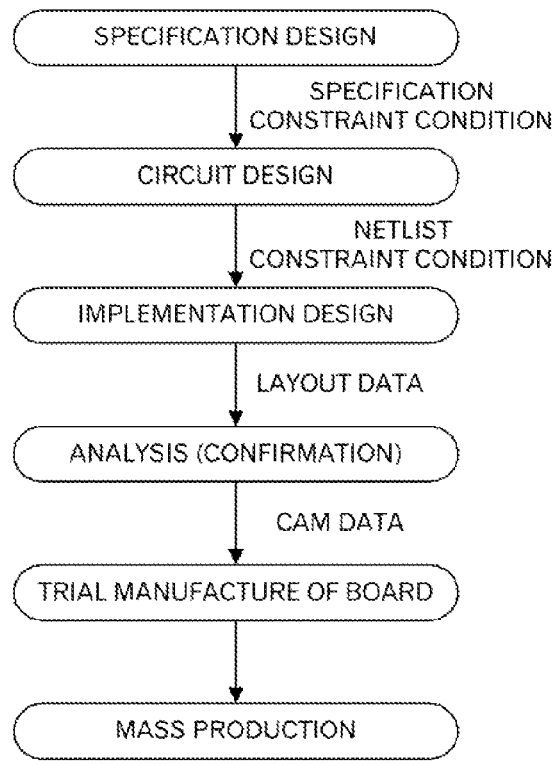
FIG.1
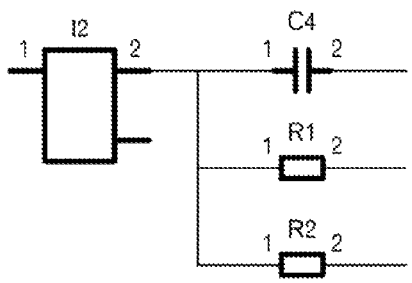
FIG.2A
COMPONENTS C4, R1 AND R2
ARE PLACED FROM
COMPONENT I2 WITHIN 15mm
FIG.2B

| COMPONENT LIBRARY TABLE |
|---|
| COMPONENT LIBRARY ID |
| COMPONENT NAME |
| COMPONENT TYPE |
| COMPONENT PIN INFORMATION |
| CHARACTERISTIC VALUE |

FIG.4

| CIRCUIT DIAGRAM TABLE |
|---|
| CIRCUIT DIAGRAM ID |
| CIRCUIT DIAGRAM NAME |
| LINK TO COMPONENT TABLE |
| LINK TO NETWORK TABLE |

FIG.5

| COMPONENT TABLE |
|---|
| COMPONENT ID |
| COMPONENT NAME |
| ATTRIBUTES |
| COMPONENT LIBRARY ID |
| SHEET NO. |
| POSITION |
| LINK TO COMPONENT PIN TABLE |
| LINK TO CONSTRAINT CONDITION TABLE |

FIG.6

| COMPONENT PIN TABLE |
|---|
| COMPONENT PIN ID |
| COMPONENT PIN NAME |
| ATTRIBUTES |
| LINK TO COMPONENT TABLE |
| LINK TO NETWORK TABLE |
| LINK TO CONSTRAINT CONDITION TABLE |

FIG.7

| NETWORK TABLE |
|---|
| NETWORK ID |
| NETWORK NAME |
| ATTRIBUTES |
| LINK TO COMPONENT PIN TABLE |
| LINK TO CONSTRAINT CONDITION TABLE |

| CONSTRAINT CONDITION TABLE |
|---|
| CONSTRAINT CONDITION ID |
| CONSTRAINT CONDITION NAME |
| LINK TO SETTING TARGET TABLE |
| CONDITION TYPE |
| INSTRUCTION CONTENTS |

| SETTING TARGET TABLE |
|---|
| SETTING TARGET ID |
| TYPE |
| SETTING TORGET NAME |
| NO. |

FIG.20

| REFERENCE CONDITION | | TARGET CONDITION | | ABSOLUTE VALUE M OF DIFFERENCE | |
|---|---|---|---|---|---|
| DIFFERENCE BETWEEN SHEET NOs. | RELATIVE COORDINATES | DIFFERENCE BETWEEN SHEET NOS. | RELATIVE COORDINATES | | |
| 0 | $(x_{R1}, y_{R1})$ | | | $M_S$ | $M_L$ |
| ... | ... | ... | ... | ... | ... |

FIG.21

| REFERENCE CONDITION | | TARGET CONDITION | | ABSOLUTE VALUE M OF DIFFERENCE | |
|---|---|---|---|---|---|
| DIFFERENCE BETWEEN SHEET NOs. | RELATIVE COORDINATES | DIFFERENCE BETWEEN SHEET NOS. | RELATIVE COORDINATES | | |
| 0 | $(x_{R1}, y_{R1})$ | 0 | $(x_{T1}, y_{T1})$ | $M_S$ | $M_L$ |
| ... | ... | ... | ... | ... | ... |

| REFERENCE CONDITION | | TARGET CONDITION | | ABSOLUTE VALUE M OF DIFFERENCE | |
|---|---|---|---|---|---|
| DIFFERENCE BETWEEN SHEET NOs. | RELATIVE COORDINATES | DIFFERENCE BETWEEN SHEET NOs. | RELATIVE COORDINATES | $M_S$ | $M_L$ |
| 0 | $(x_{R1}, y_{R1})$ | 0 | $(x_{T1}, y_{T1})$ | 0 | $(|x_{T1}-x_{R1}|, |y_{T1}-y_{R1}|)$ |
| ... | ... | ... | ... | ... | ... |

FIG.22

| CONSTRAINT CONDITION ID | RS232C-1 | | RS232C-2 | |
|---|---|---|---|---|
| NO. | SETTING TARGET NAME | SETTING TARGET ID | SETTING TARGET NAME | SETTING TARGET ID |
| 1 | I3 | I-03 | I4 | I-04 |
| 2 | C5 | C-05 | C8 | C-08 |
| 3 | C6 | C-06 | | |
| 4 | C7 | C-07 | C10 | C-10 |
| 5 | R3 | R-03 | R4 | R-04 |
| 6 | | | C9 | C-09 |

| CONSTRAINT CONDITION ID | 2.5V | | 3.3V | | 76.8M PPL | |
|---|---|---|---|---|---|---|
| NO. | SETTING TARGET NAME | SETTING TARGET ID | SETTING TARGET NAME | SETTING TARGET ID | SETTING TARGET NAME | SETTING TARGET ID |
| 1 | R2944 | R-2944 | STB11 | S-TB11 | C376 | C-376 |
| 2 | R2945 | R-2945 | R1173 | R-1173 | C377 | C-377 |
| 3 | R2946 | R-2946 | R1174 | R-1174 | R1922 | R-1922 |
| 4 | R2947 | R-2947 | C669 | C-669 | C378 | C-378 |
| 5 | R10973 | R-10973 | C670 | C-670 | C379 | C-379 |
| 6 | TM14 | T-M14 | C20017 | C-20017 | C380 | C-380 |
| 7 | C359 | C-359 | C20018 | C-20018 | R1923 | R-1923 |
| 8 | C360 | C-360 | R10974 | R-10974 | R1924 | R-1924 |
| 9 | C361 | C-361 | C673 | C-673 | R1925 | R-1925 |
| 10 | C362 | C-362 | C674 | C-674 | R1927 | R-1927 |
| 11 | C363 | C-363 | R1172 | R-1172 | R2338 | R-2338 |
| 12 | C364 | C-364 | L20014 | L-20014 | R2357 | R-2357 |
| 13 | C365 | C-365 | | | C371 | C-371 |
| 14 | C366 | C-366 | | | R1929 | R-1929 |
| 15 | C367 | C-367 | | | R1931 | R-1931 |

FIG.27

IMPLEMENTATION DESIGN SUPPORT METHOD AND APPARATUS

CROSS-REFERENCE TO RELATED APPLICATIONS

This application is based upon and claims the benefit of priority of the prior Japanese Patent Application No. 2011-076095, filed on Mar. 30, 2011, the entire contents of which are incorporated herein by reference.

FIELD

This technique relates to a technique for supporting design of printed circuit boards.

BACKGROUND

FIG. 1 illustrates an example of a procedure performed in development of a printed circuit board. In the development of the printed circuit board, there are steps such as specification design, circuit design, implementation design, analysis (confirmation), trial manufacture of the board, and mass production. In the specification design, system requirements such as the functions to be achieved, and manufacturing conditions such as the placement restrictions and the number of layers are determined, and instructions are given to the designer of the circuit design by way of a specifications document. In the circuit design, a netlist expressing the components and power supply to be used and the wiring of those components, and constraint conditions in the implementation are determined, after which instructions are given to the implementation designer. The netlist is exchanged, for example, in EDIF (Electronic Design Interchange Format) format. Moreover, the constraint conditions include, for example, the position relationship among components, the wiring length of the network, the wire spacing, the number of bypass capacitors and the like. The constraint conditions are also exchanged as electronic data in a format that can be read, for example, by a CAD (Computer Aided Design) system. In the implementation design, the arrangement of components and the wiring pattern on the printed circuit board are designed. In the work up to this point, the actual layout on the printed circuit board is determined. After that, in the analysis (confirmation), the layout data is used in performing the analysis of whether any problems in the manufacturing will occur. CAM (Computer Aided Manufacturing) data for manufacturing the printed circuit board is then given to the production line, and a trial printed circuit board is manufactured, and when there are no problems, the printed circuit board is mass-produced.

In such a procedure as this, there are already systems that automatically carry out the implementation design of the printed circuit board. For example, using a database that stores standard shapes, constraints on the design, placement order of circuit blocks and the like, the placement of the circuit blocks and the wiring between the circuit blocks are determined so as to satisfy the constraints on the design, and to be accommodated within a predetermined board.

Here, an example of constraint conditions for the netlist and position relationship of components that are determined in the circuit design will be explained using FIG. 2A and FIG. 2B. First, in order to define the components, power supply, ground and the like, and the connection relationships of these, the designer of the circuit design creates data for a circuit diagram such as illustrated in FIG. 2A. In the circuit diagram illustrated in FIG. 2A, component pin 2 of component I2 is connected with component pin 1 of component C4, component pin 1 of component R1 and component pin 1 of component R2, respectively. From data of such a circuit diagram, a netlist is then created that includes data for the components and the like, and data for the connection relationships among those components, and that netlist is given to the designer of the implementation design. The designer of the circuit design also sets constraint conditions such as illustrated in FIG. 2B for the position relationships of component groups that are included in such a circuit diagram. In the constraint conditions illustrated in FIG. 2B, a condition that "components C4, R1 and R2 are to be placed within 15 mm from component I2" is defined. Typically, plural constraint conditions for a part of the components included in such a circuit diagram are registered. Here, in case that the designer of the implementation design determines the placement position on the printed circuit board for components that are regulated in one constraint condition, when it is possible to apply the placement position of the components to components that are regulated in another suitable constraint condition, it is possible to lighten the burden of the work.

However, in the circuit design that is carried out before the implementation design, designation that it is possible to apply the placement position on the printed circuit board for a component defined in a certain constraint condition to the placement position of a component defined in another constraint condition is not always made. Moreover, there is also a case where, even when the association between the constraint conditions is recognized, the correlation between components that are regulated in one constraint condition and components that are regulated in another constraint condition may not always be clear. Furthermore, there is also a case where components having no correlation may be included in one of the constraint conditions.

In an analog LSI (Large Scale Integrated circuit), there is also an element shape determining method for satisfying the layout constraints and achieving the large-scale integration. For example, a closely spacing condition that is set in advance to keep the same shape is input, and when there are plural elements in the netlist, which match with the condition, those elements are handled as one group. Moreover, when there are elements which correspond to basic shape designation in which the basic shape is defined in advance, the element shape is determined using that basic shape.

In addition, in the design of the analog LSI, there is also a technique for selecting the optimum wiring candidate elements. For example, when an arbitrary element that has already been wired is treated as a reference element, all of the elements that will be connected to that reference element are extracted, and the connection relationships between the reference element and the extracted elements are compared with a layout condition file to carry out ranking of placement candidate elements, and the placement candidate elements are automatically selected according to that ranking.

Conventionally, the correlation between components defined in the constraint condition as a reference and components defined in another constraint condition cannot be clearly grasped.

SUMMARY

An information processing method relating to this technique includes: (A) identifying a first reference component from among first components defined in a first constraint condition that is a reference designated from among constraint conditions regarding a position relationship between plural components on a printed circuit board; (B) identifying a second reference component from among second components defined in a second constraint condition that is to be compared with the first constraint condition and included in the constraint conditions; and (C) identifying a fourth component that is a component other than the second reference component among the second components and has a correspondence with a third component, based on position relationships with the third component and an attribute of the third component, wherein the third component is a component other than the first reference component among the first components.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram depicting an example of a development procedure of a printed circuit board;

FIG. 2A is a diagram depicting an example of a circuit diagram;

FIG. 2B is a diagram depicting an example of a constraint condition for the position relationship of components;

FIG. 4 is a diagram depicting an example of a data structure of a component library table;

FIG. 5 is a diagram depicting an example of a data structure of a circuit diagram table;

FIG. 6 is a diagram depicting an example of a data structure of a component table;

FIG. 7 is a diagram depicting an example of a data structure of a component pin table;

FIG. 20 is a diagram depicting an example of data stored in a data storage unit;

FIG. 21 is a diagram depicting an example of data stored in the data storage unit;

FIG. 22 is a diagram depicting an example of data stored in the data storage unit;

FIG. 27 is a diagram depicting an example of display of components; and

DESCRIPTION OF EMBODIMENTS

Figure 3:
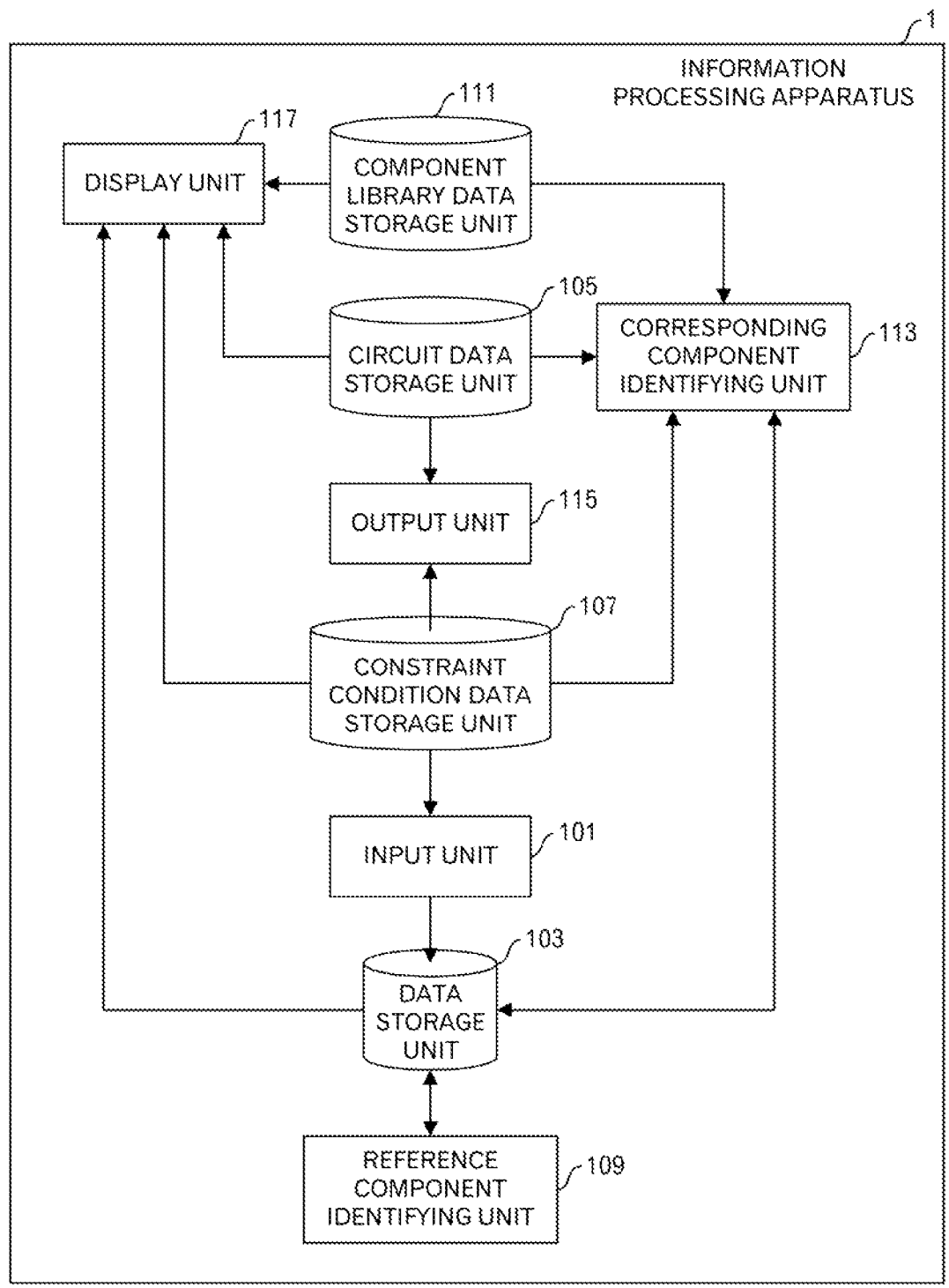
FIG. 3 is a functional block diagram of an information processing apparatus relating to this embodiment.

FIG. 3 illustrates a functional block diagram of an information processing apparatus 1 relating to an embodiment of this technique. The information processing apparatus 1 relating to this embodiment has: an input unit 101 that accepts inputs from a user; a data storage unit 103, a circuit data storage unit 105 that stores data concerning a circuit diagram that was designed by a user in the circuit design; a constraint condition data storage unit 107 that stores constraint condition data that represents constraints when implementing the circuits that are defined by the circuit diagram data on a printed circuit board; a reference component identifying unit 109; a component library data storage unit 111 that stores data about components that can be used in the circuit design; a corresponding component identifying unit 113; an output unit 115; and a display unit 117.

The input unit 101 accepts inputs from a user, and identifies, from constraint condition data that is stored in the constraint condition data storage unit 107, reference conditions that will be a reference when correlating components, and target conditions that will be compared with the reference conditions, and stores data for identifying the reference conditions and data for identifying the target conditions into the data storage unit 103. The reference component identifying unit 109 uses the data that is stored in the data storage unit 103 to identify, from among the components that are defined in the reference conditions and the target conditions, reference components that will be a reference when comparing components that are defined in the reference conditions and the target conditions, and stores the processing result in the data storage unit 103. The corresponding component identifying unit 113 uses data that is stored in the data storage unit 103, circuit data storage unit 105, constraint condition data storage unit 107 and component library data storage unit 111 to identify the correlation between the components that are defined in the constraint conditions stored in the constraint condition data storage unit 107, and stores the constraint condition data for which the correlation with the components was identified, in the constraint condition data storage unit 107. Incidentally, circuit diagram data that is created in the circuit design is not included in the netlist or constraint conditions that are given to the implementation designer. The corresponding component identifying unit 113 of this embodiment identifies from among components that are defined in a certain constraint condition and components that are defined in another constraint condition, combinations of components to which the similar placement position can be applied in the implementation design, based on such circuit diagram data. The output unit 115 then outputs data that is stored in the circuit data storage unit 105 and in the constraint condition data storage unit 107. Information representing the combination of components to which the similar placement position can be applied in the implementation design is included in the outputted data. The display unit 117 also uses data that is stored in the data storage unit 103, circuit data storage unit 105, constraint condition data storage unit 107 and component library data storage unit 111 to carry out a suitable display processing.

Next, FIG. 4 to FIG. 27 will be used to explain the processing by the information processing apparatus 1 that is illustrated in FIG. 3. It is presumed that an extraction algorithm, which is used to identify corresponding components, was selected in advance in this embodiment by a user, and judgment conditions and threshold values, which are used when determining the correlation between components, are stored in advance in the data storage unit 103.

Moreover, it is presumed that a component library table such as illustrated in FIG. 4 is registered beforehand in the component library data storage unit 111. The component library table illustrated in FIG. 4 includes items of a component library ID (identifier), component name, component type, component pin information and characteristic value. Components that will be used in the circuit design are registered in the component library table. It is presumed that unique identifiers in the table are set in a column of the component library ID, component names are set in a column of the component name, the type of component such as resistor, capacitor, coil and the like are set in a column of the component type, the numbers that are attached for convenience to the component pins, and attributes of the component pins, which represent properties such as whether the pin is a positive pole or negative pole are set in a column of the component pin information, and characteristic values of each of the components are set in a column of the characteristic value.

Figures 8, 9, 10, 11:
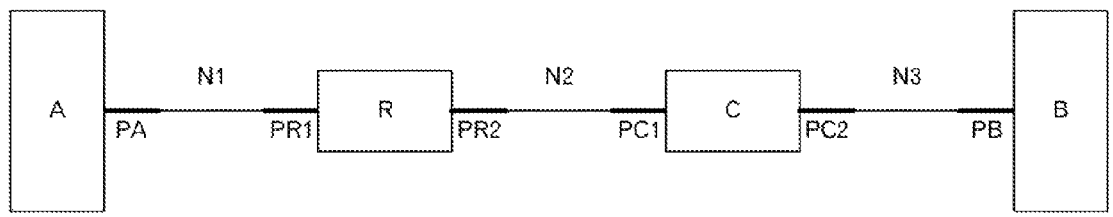
FIG. 8 is a diagram depicting an example of a data structure of a network table.
FIG. 9 is a diagram depicting an example of a circuit diagram.
FIG. 10 is a diagram depicting an example of a data structure of a constraint condition table.
FIG. 11 is a diagram depicting an example of a data structure of a setting target table.

When the user completes the circuit design, it is presumed that a circuit diagram table such as illustrated in FIG. 5, a component table such as illustrated in FIG. 6, a component pin table such as illustrated in FIG. 7 and a network table such as illustrated in FIG. 8 are stored in the circuit data storage unit 105. The circuit diagram table illustrated in FIG. 5 includes items of a circuit diagram ID (identifier), circuit diagram name, link to the component table and link to the network table. The unique identifier in the table is registered in a column of the circuit diagram ID, the name attached to the circuit diagram are registered in a column of the circuit diagram name, a link to a record in the component table, which represents a component included in the circuit diagram, is registered in a column of the component table link, and a link to a record in the network table, which represents a network included in the circuit diagram, is registered in a column of the network table link. A record that includes such items is stored in association with the circuit diagram designed by the user.

Moreover, the component table illustrated in FIG. 6 includes items of a component ID (identifier), component name, component library ID (identifier), attributes, sheet number, position, link to a component pin table and link to a constraint condition table. It is presumed that a unique identifier in the table is registered in a column of the component ID, a component name is registered in a column of the component name, an identifier of a corresponding component that is registered in the component library table is registered in a column of the component library ID, attributes that represent the properties of the component are registered in a column of the attributes, the number that is attached to a sheet that are obtained by conveniently dividing circuit diagram data as will be explained later is registered in a column of the sheet number, and coordinates of a position where the component in a sheet representing a circuit diagram is located are registered in a column of the position. A record that includes such items is correlated and registered with each of the components that are used in the circuit diagram designed by the user.

The component pin table that is illustrated in FIG. 7 includes items of a component pin ID (identifier), component pin name, attributes, link to the component table, link to the network table and link to the constraint condition table. A unique identifier in the table is set in a column of the component ID, the name attached to the component pin is set in a column of the component pin name, attributes that represent the properties of the component such as whether the pin is a positive pole or negative pole, are set in a column of the attributes, a link to a record in the component table, which represents a component having that component pin, are set in a column of the link to the component table, and a link to a record in the constraint condition table, which represents constraint conditions when the constraint conditions are set for that component pin, are set in a column of the link to the constraint condition table. A record that includes such items is correlated and registered with each of the component pins of the component that is used in the circuit design.

In addition, the network table illustrated in FIG. 8 includes items of a network ID (identifier), network name, attributes, link to the component pin table and link to the constraint condition table. A unique identifier in the table is set in a column of the network ID, the name attached to the network is set in a column of the network name, attributes that represent the properties of the network such as power supply, signal or ground are set in a column of the attributes, a link to a record in the component pin table, which represents the component pin that is connected to the network is set in a column of the link to the component pin table, and a link to a record in the constraint condition table, which represents constraint conditions when the constraint conditions have been set for the network is set in a column of the link to the constraint condition table link. Such a record is correlated and registered with each network that is connected to the component pin in the circuit diagram.

For example, FIG. 9 illustrates an example of the connection relationship of components included in a circuit. In the circuit diagram of FIG. 9, there are component A, component R, component C and component B. In addition, a component pin PA of the component A and a component pin PR1 of the component R are connected by a network N1, a component pin PR2 of the component R and component pin PC1 of the component C are connected by a network N2, and a component pin PC2 of the component C and component pin PB of the component B are connected by network N3. When there is such a circuit diagram, one record that represents the entire circuit diagram is registered in the circuit diagram table, records that respectively represents the component A, component R, component C and component B are registered in the component table, records that respectively represents the component pin PA, component pin PR1, component pin PR2, component pin PC1, component pin PC2 and component pin PB are registered in the component pin table, and records that respectively represents the network N1, network N2 and network N3 are registered in the network table.

As illustrated in FIG. 4 to FIG. 8, links to the records for the component A, component R, component C and component B, and links to the records for the network N1, network N2 and network N3 are set in the record for the overall circuit diagram. A link to the record for the component pin PA is set in the record for the component A, links to records for the component pin PR1 and component pin PR2 are set in the record for the component R, links to the records for the component pin PC1 and component pin PC2 are set in the record for the component C, and a link to the record for the component pin PB is set in the record for the component B. Moreover, links to the records for the component A and network N1 are registered in the record for the component pin PA, links to the records for the component R and network N1 are registered in the record for the component pin PR1, links to the records for the component R and network N2 are registered in the record for the component pin PR2, links to the records for the component C and network N2 are registered in the record for the component pin PC1, links to the records for the component C and network N3 are registered in the record for the component pin PC2, and links to the records for the component B and network N3 are registered in the record for the component pin PB. Furthermore, links to the records for the component pin PA and component pin PR1 are registered in the record for the network N1, links to the records for the component pin PR2 and component pin PC1 are registered in the record for the network N2, and links to the records for the component pin PC2 and component pin PB are registered in the record for the network N3.

A constraint condition table such as illustrated in FIG. 10 and a setting target table such as illustrated in FIG. 11 are registered in the constraint condition data storage unit 107. The constraint condition table illustrated in FIG. 10 includes items of a constraint condition ID (identifier), constraint condition name, link to the setting target table, condition type and instruction contents. A unique identifier in the table is registered in a column of the constraint conditions ID, a name of the constraint condition is registered in a column of the constraint condition name, a link to a record in the setting target table, which represents components restricted by the constraints, is registered in a column of the link to the setting target table, the type of the constraint condition such as the position relationship between components, wiring length, wire spacing and the like is registered in a column of the condition type, and data representing the contents of the conditions, such as "the position is within a predetermined distance from a specific component", "the position is within the area of a predetermined shape" or "the wiring length is within a predetermined distance" are registered in a column of the instruction contents. A record that includes such items is correlated and registered with each of the constraint conditions that are set by the user.

Moreover, the setting target table illustrated in FIG. 11 includes items of a setting target ID (identifier), type, setting target name and setting target number. A unique identifier in the table is registered in a column of the setting target ID, the type of the setting target such as component, component pin, or network is registered in a column of the type, the name of the setting target is registered in a column of the setting target name, and the number that is not duplicated in the records linked from one constraint condition is registered in a column of the number. In this embodiment, the same identifier as the component ID in the component table, the component pin ID in the component pin table or the network ID in the network table is registered, and the data in the circuit data storage unit 105 is associated with the data in the constraint condition data storage unit 107. Such a record is registered for each of the components defined as targets for which the constraints are set.

Figure 12:
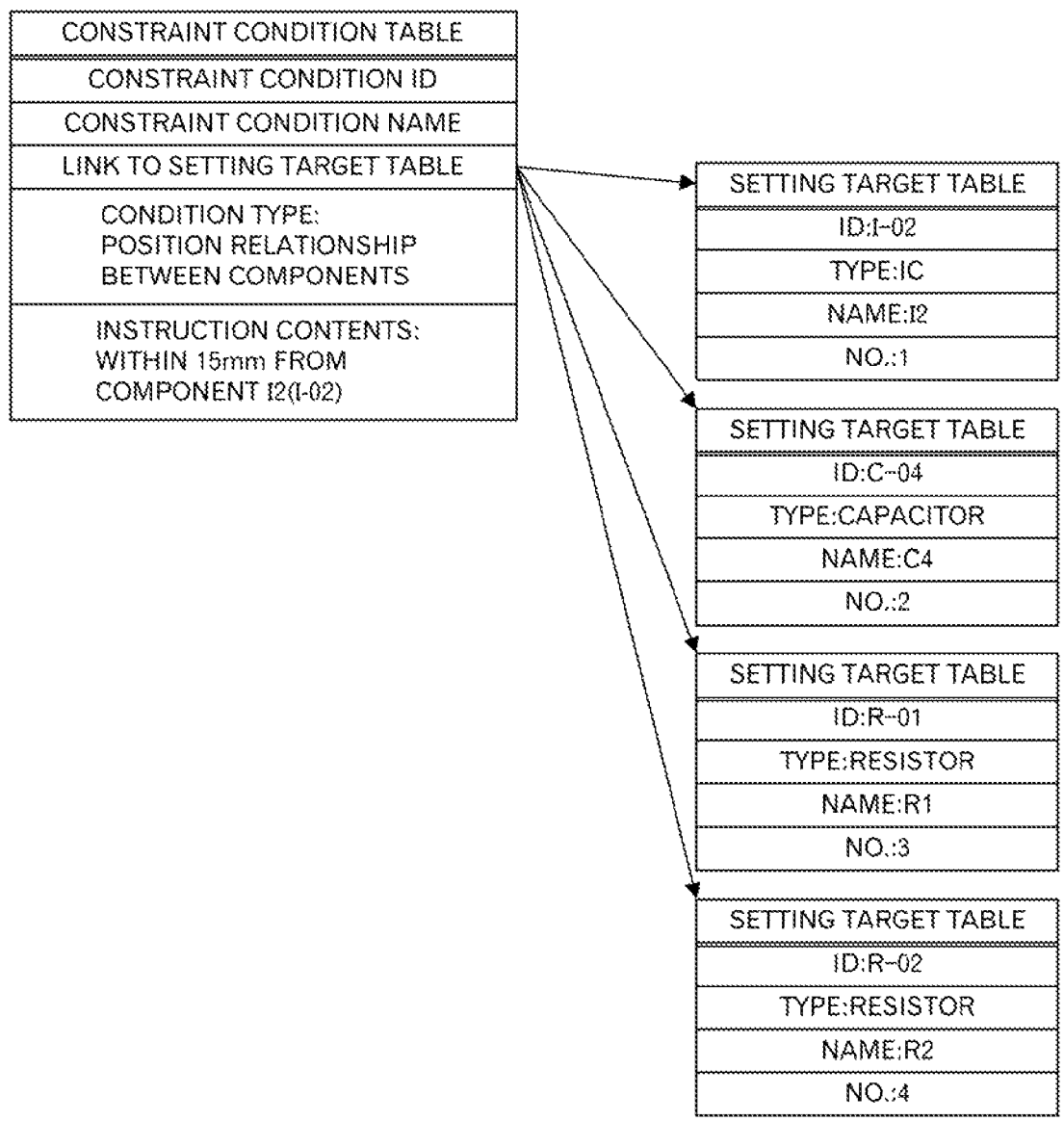
FIG. 12 is a diagram depicting an example of data stored in the constraint condition table and the setting target table.
Figure 13:
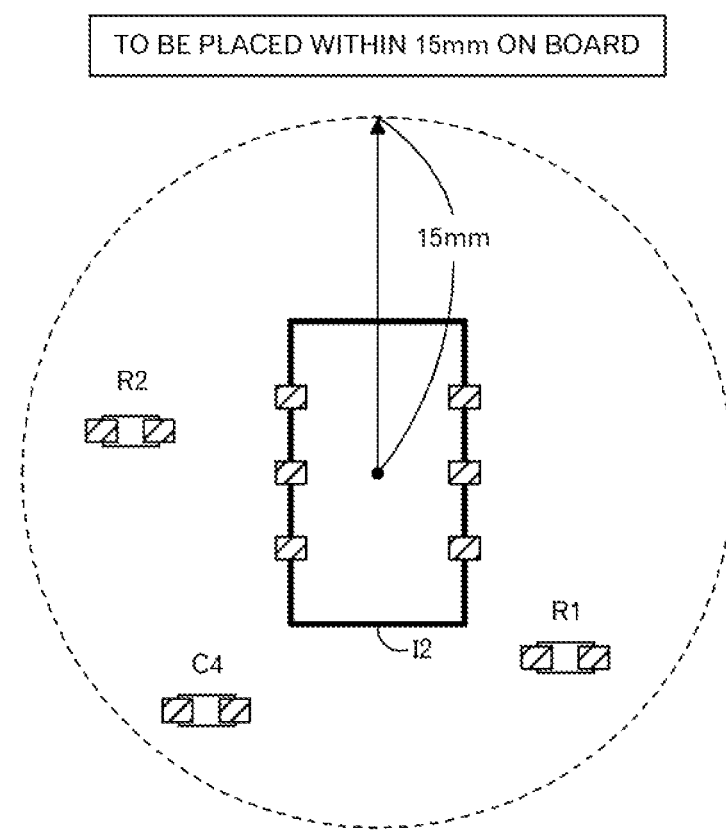
FIG. 13 is a diagram to explain constraint conditions.

Incidentally, the constraint condition illustrated in FIG. 2B is registered in the constraint condition table and setting target table as a record such as illustrated in FIG. 12. In the record of the constraint condition table illustrated in FIG. 12, "position relationship between components" is registered as the condition type, and data representing the component is to be placed within 15 mm from component I2 is registered as the instruction contents. Links to records representing the components related to that constraint condition is set in the column of the link to the setting target table. A component that is the nucleus (reference) of the position relationship (component I2 in the example illustrated in FIG. 12) and the components that are restricted by the constraint of the position relationship (component C4, component R1 and component R2 in the example illustrated in FIG. 12) are registered in the setting target table. When the record in the constraint condition table and record in the setting target table are registered in the circuit design, a constraint such as illustrated in FIG. 13, for example, is imposed in the implementation design. The component I2, component C4, component R1 and component R2, which are registered in the setting target table illustrated in FIG. 12, are located on the printed circuit board illustrated in FIG. 13. As defined in the instruction contents in the constraint condition table illustrated in FIG. 12, the component C4, component R1 and component R2 are placed within a radius of 15 mm from the component I2. The distance on the printed circuit board is determined with one preset point on each component, such as the center or lower left, as a reference.

Figure 14:
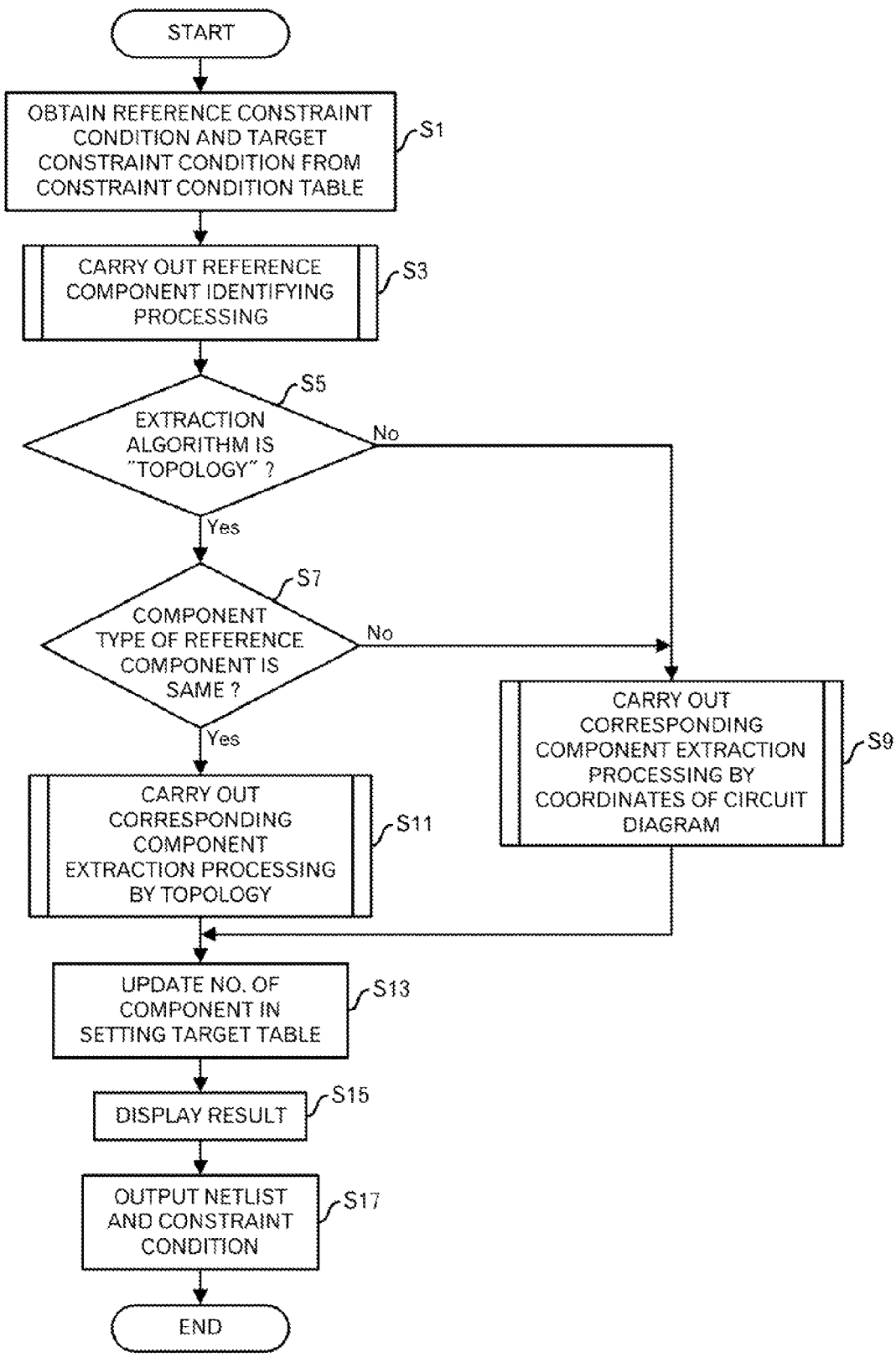
FIG. 14 is a diagram depicting a main processing flow.

FIG. 14 illustrates a processing flow of the information processing apparatus 1 relating to this embodiment. First, the input unit 101 of the information processing apparatus 1 accepts inputs from a user, and respectively identifies a constraint condition that will be the reference in the process processing as a reference condition from among the constraint condition data that is stored in the constraint condition data storage unit 107, and identifies a constraint condition that will be a target for comparison as a target condition. Then, the input unit 101 then stores the data for identifying the reference condition and target condition in the data storage unit 103 (FIG. 14: step S1). Here, the input unit 101 respectively accepts designations from the user for the reference condition and target condition, and stores a constraint condition ID of each of them, for example, in the data storage unit 103. Incidentally, the display unit 117, for example, displays the data that is stored in the constraint condition data storage unit 107 on a display device, and prompts the user to designate constraint conditions.

Figure 15:
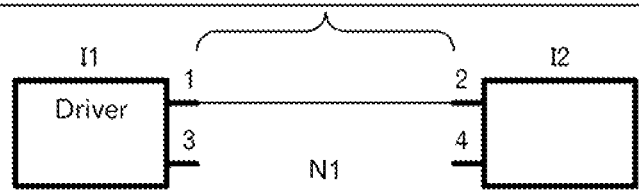
FIG. 15 is a diagram depicting an example of the constraint conditions.
Figure 16:
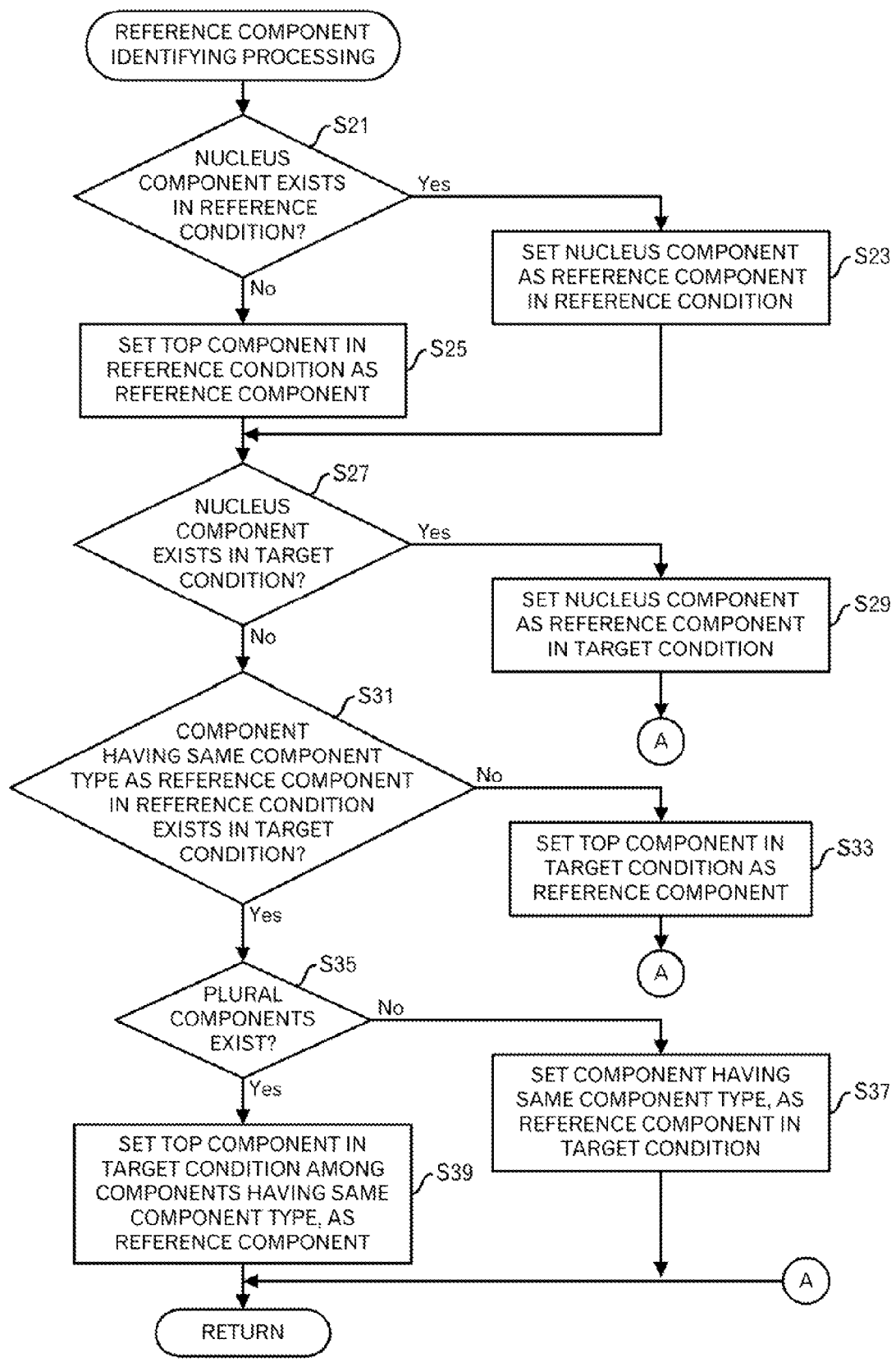
FIG. 16 is a diagram depicting a processing flow of a reference component identifying processing.

Here, not only constraint conditions for the position relationship between components such as illustrated in FIG. 2B, but also a constraint condition for the wiring length such as illustrated in FIG. 15 is registered. The example in FIG. 15 shows that component pin I1.1 of component I1 and component pin I2.2 of component I2 that are illustrated in the circuit diagram should be to be mounted on the printed circuit board with a wiring length of 10 mm or less. However, in this embodiment, the constraint condition for the position relationship between components as illustrated in FIG. 2B is taken to be a target of the processing. Therefore, at the step S1, it is presumed that designations are accepted from the user to identify, as the target, the constraint conditions for which "position relationship between components" is registered in the column of the condition type of the constraint condition table.

Next, the reference component identifying unit 109 of the information processing apparatus 1 carries out a reference component identifying processing (step S3). This reference component identifying processing will be explained using FIG. 16. First, the reference component identifying unit 109 acquires a pertinent record from the constraint condition table in the constraint condition data storage unit 107, based on the data to identify the reference condition, which is stored in the data storage unit 103, and determines whether or not the component that is a nucleus of the position relationship is set in the column of the instruction contents in that record (FIG.

16: step S21). For example, when the constraint condition illustrated in FIG. 12 is identified as the reference condition, the component I2 is set as the nucleus of the position relationship in the column of the instruction contents.

When such a component that is the nucleus of the position relationship has been set, the reference component identifying unit 109 identifies the nucleus component as the reference component of the reference condition, and stores data to identify the reference component of the reference condition in the data storage unit 103 (step S23). The setting target ID of the setting target table is stored, for example, as the data to identify the reference component. On the other hand, when the component that is the nucleus of the position relationship is not set in the column of the instruction contents in the constraint condition table (for example, placement of certain components in an area having a predetermined shape is designated in the column of the instruction contents), the reference component identifying unit 109 identifies, as the reference component, the component relating to the record having the smallest number that is registered in the column of the number in the record of the setting target table that are linked from the reference condition table, and stores data to identify the reference component in the data storage unit 103 (step S25).

Then, after the step S23 or step S25, the reference component identifying unit 109 acquires a pertinent record from the constraint condition table in the constraint condition data storage unit 107 based on the data to identify a target condition, which is stored in the data storage unit 103, and determines whether or not the component that is the nucleus of the position relationship is set in the column of the instruction contents (step S27). The reference component identifying unit 109 then carries out the similar judgment to that at the step S21 for the target condition, and when it is determined that the nucleus component is set, the reference component identifying unit 109 identifies that component as the reference component of the target condition, and stores data to identify the reference component of the target condition in the data storage unit 103 (step S29). After that, the reference component identifying processing ends via terminal A, and the processing returns to the processing in FIG. 14.

On the other hand, when it is determined that the nucleus component is not set, the reference component identifying unit 109 determines whether or not a record whose component type is the same as that of the reference component of the reference condition that was set at the step S23 or step S25 exists in the records of the setting target table, which are linked from the record of the target condition in the constraint condition table in the constraint condition data storage unit 107 (step S31). When it is determined that there are no records having the same component type, the reference component identifying unit 109 identifies, from among the records linked from the record of the target condition in the setting target table, a component relating to the record having the smallest number registered in the column of the number, as the reference component of the target condition, and stores data to identify that reference component in the data storage unit 103 (step S33). After that, the reference component identifying processing ends via the terminal A, and the processing returns to the processing in FIG. 14.

On the other hand, when there is a record having the same component type, the reference component identifying unit 109 determines whether or not there are plural pertinent records (step S35). When there is one record having the same component type as the reference component of the reference condition, the reference component identifying unit 109 identifies the component relating to that pertinent record as the reference component of the target condition, and stores data to identify the reference component in the data storage unit 103 (step S37). After that, the reference component identifying processing ends via the terminal A, and the processing returns to the processing in FIG. 14.

On the other hand, when there are plural records whose component type is the same as the component type of the reference component of the reference condition, the reference component identifying unit 109 identifies, from among the records whose component type is the same as the component type of the reference component of the reference condition, a component relating to a record having the smallest number that is registered in the column of the number, as the reference component of the target condition, and stores the data to identify that reference component in the data storage unit 103 (step S39). After that, the reference component identifying processing ends, and the processing returns to the processing in FIG. 14.

Returning to the explanation of the processing in FIG. 14, the corresponding component identifying unit 113 of the information processing apparatus 1 reads, from the data storage unit 103, an extraction algorithm to be used for extracting corresponding components, and determines whether or not the extraction algorithm is a "topology" algorithm (step S5). The extraction algorithm may be a "circuit diagram coordinates" algorithm for identifying corresponding components based on the coordinates on the circuit diagram that was created in the circuit design, or a "topology" algorithm for identifying corresponding components based on information on the type and connection state of components on the circuit diagram (circuit topology). When the extraction algorithm is not a "topology" algorithm, or in other words, when the extraction algorithm is a "circuit diagram coordinates" algorithm, the processing moves to step S9.

On the other hand, when the extraction algorithm is a "topology" algorithm, the corresponding component identifying unit 113 determines whether or not the component type that is included in the record of the reference component for the reference condition in the setting target table in the constraint condition data storage unit 107 is the same as the component type that is included in the record of the reference component for the target condition (step S7). When the component type is not the same, or when it was determined at the step S5 that the extraction algorithm was not a "topology" algorithm, the corresponding component identifying unit 113 carried out a corresponding component extraction processing by the circuit diagram coordinates (step S9). The corresponding component identifying processing by the circuit diagram coordinates will be explained using FIG. 17 to FIG. 24.

Figure 17:
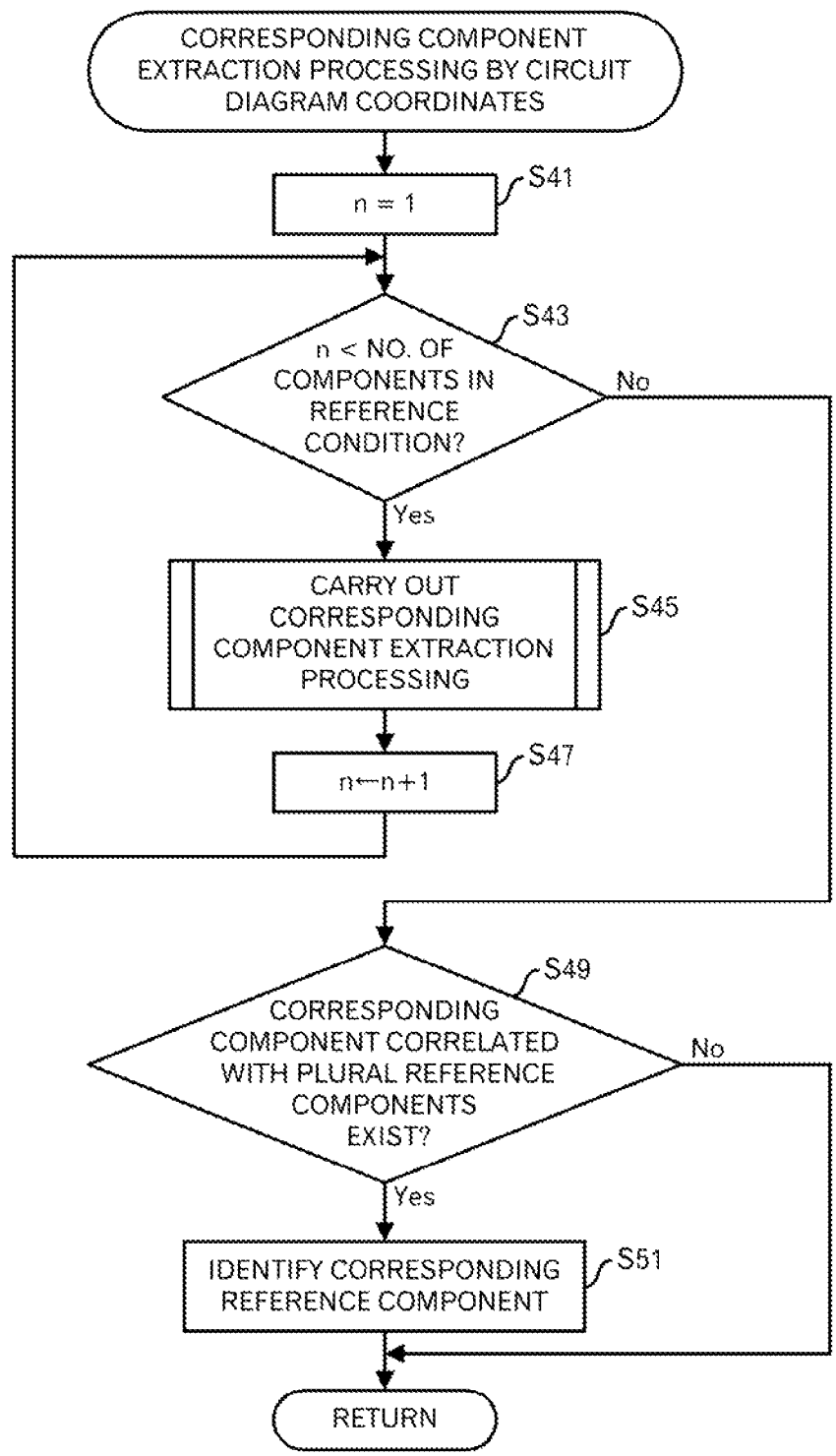
FIG. 17 is a diagram depicting a processing flow of a corresponding component extraction processing by circuit diagram coordinates.

First, the corresponding component identifying unit 113 initializes an index number n, which is used to control the processing for the reference condition, to "1" (FIG. 17: step S41). Then, the corresponding component identifying unit 113 determines whether or not "n" is less than the number of records in the setting target table, which are defined in the reference condition (step S43). In this embodiment, the subsequent processing is repeated (n−1) times, which is equal to the number of records other than the record relating to the reference component among records defined in the reference condition. At this step, when it is determined that "n" is equal to or greater than the number of records in the setting target table, which are defined in the reference condition, the processing moves to step S49. On the other hand, when "n" is determined to be less than the number of records in the setting target table, which are defined in the reference condition, the corresponding component identifying unit 113 carries out a corresponding component extraction processing (step S45).

This corresponding component extraction processing will be explained using FIG. 18 to FIG. 24.

Figure 18:
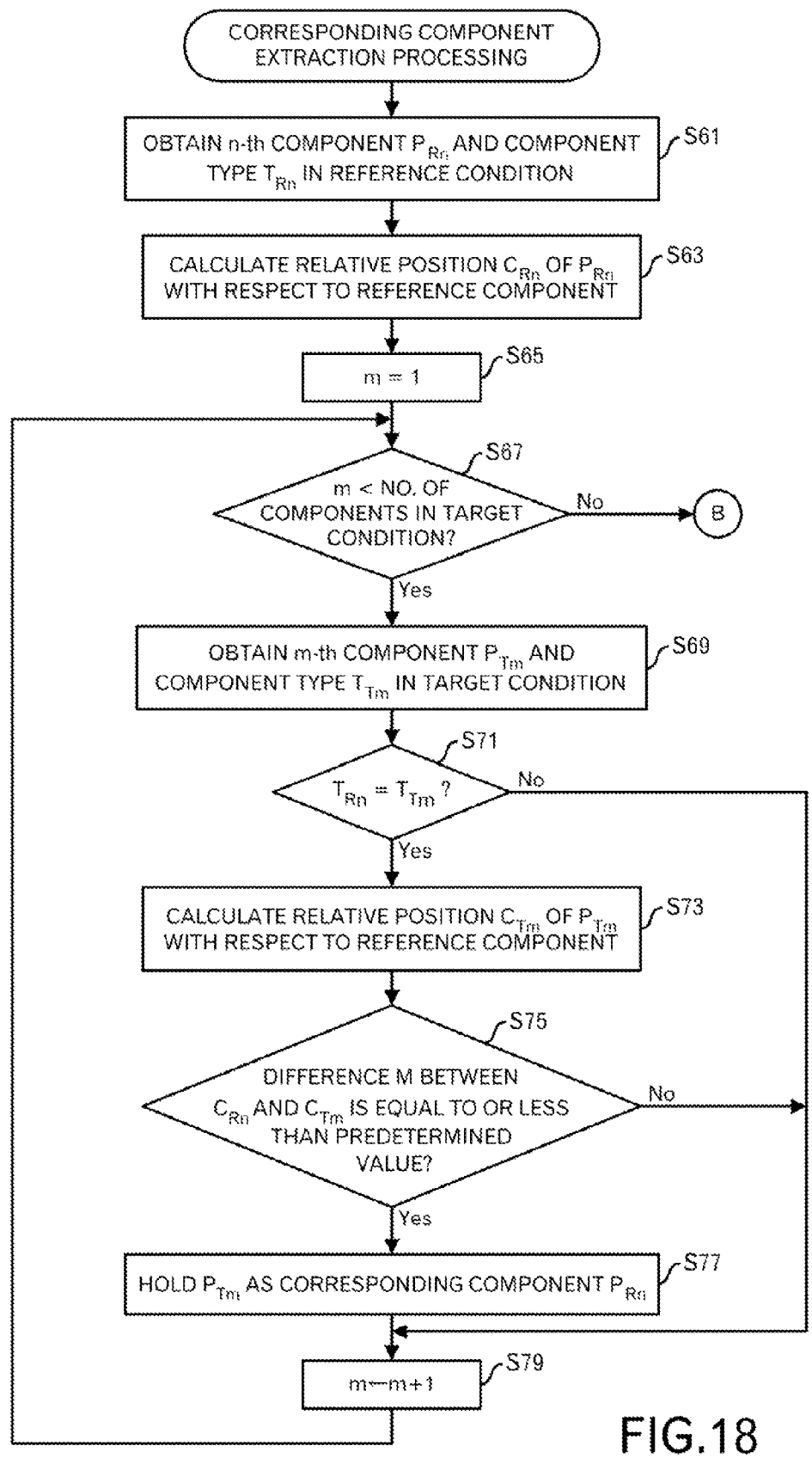
FIG. 18 is a diagram depicting a processing flow of the corresponding component extraction processing.

First, the corresponding component identifying unit 113 acquires a component relating to the n-th record as $P_{Rn}$ from the components that is other than the reference component but is defined in the reference condition in the constraint condition storage unit 107, and the component type for that component as $T_{Rn}$, and stores the acquired data in the data storage unit 103 (FIG. 18: step S61). Here, first, the corresponding component identifying unit 113 uses the data to identify the reference condition, which is stored in the data storage unit 103 to acquire the records for the reference condition from the constraint condition table in the constraint condition data storage unit 107. Then, the corresponding component identifying unit 113 acquires, from the records in the setting target table, which are linked from the acquired record of the reference condition, the setting target ID of the component relating to the n-th record as $P_{Rn}$, and acquires the component type of the n-th record as $T_{Rn}$, and stores them in the data storage unit 103.

Then, the corresponding component identifying unit 113 calculates the relative position $C_{Rn}$ of the acquired component $P_{Rn}$ on the circuit diagram with respect to reference component, and stores the calculation result in the data storage unit 103 (step S63). Here, respectively using, as keys, the setting target IDs of the components in the setting target table for both $P_{Rn}$ and the reference component, the corresponding component identifying unit 113 searches the component table in the circuit data storage unit 105 to acquire the sheet numbers and positions of the pertinent records. The corresponding component identifying unit 113 then calculates a difference between the sheet numbers and the relative coordinates of $P_{Rn}$ from the reference component as a reference point, and stores the calculation result in the data storage unit 103.

Here, sheets in the circuit diagram data will be explained. In the circuit diagram data created by the user, one circuit may be designed in plural separate sheets. In such a case, the plural sheets are managed by the sheet numbers, for example. The sheets represent virtual division of the circuit, and they differ from layers of a multi-layered printed circuit board. When designing a circuit diagram by dividing the circuit into the sheets, how the circuit will be divided depends on the user, however, there is a trend for a user to group components according to the functions, and place the grouped components on the circuit diagram, and by using a function of a CAD system, the circuit diagram may be generated by copying and modifying similar components on the circuit diagram.

These sheet numbers are for convenience, and in the case, for example, when two components are on different sheets, the difference between the sheet numbers may be used as a scale to express the relative positional relationship between the components. On the other hand, when the difference between sheet numbers is not used, it is possible to compare the coordinates in each sheet as they are, or it is also possible to define a connection relationship between sheets beforehand, and to calculate relative coordinates over the sheets.

Figure 19A:
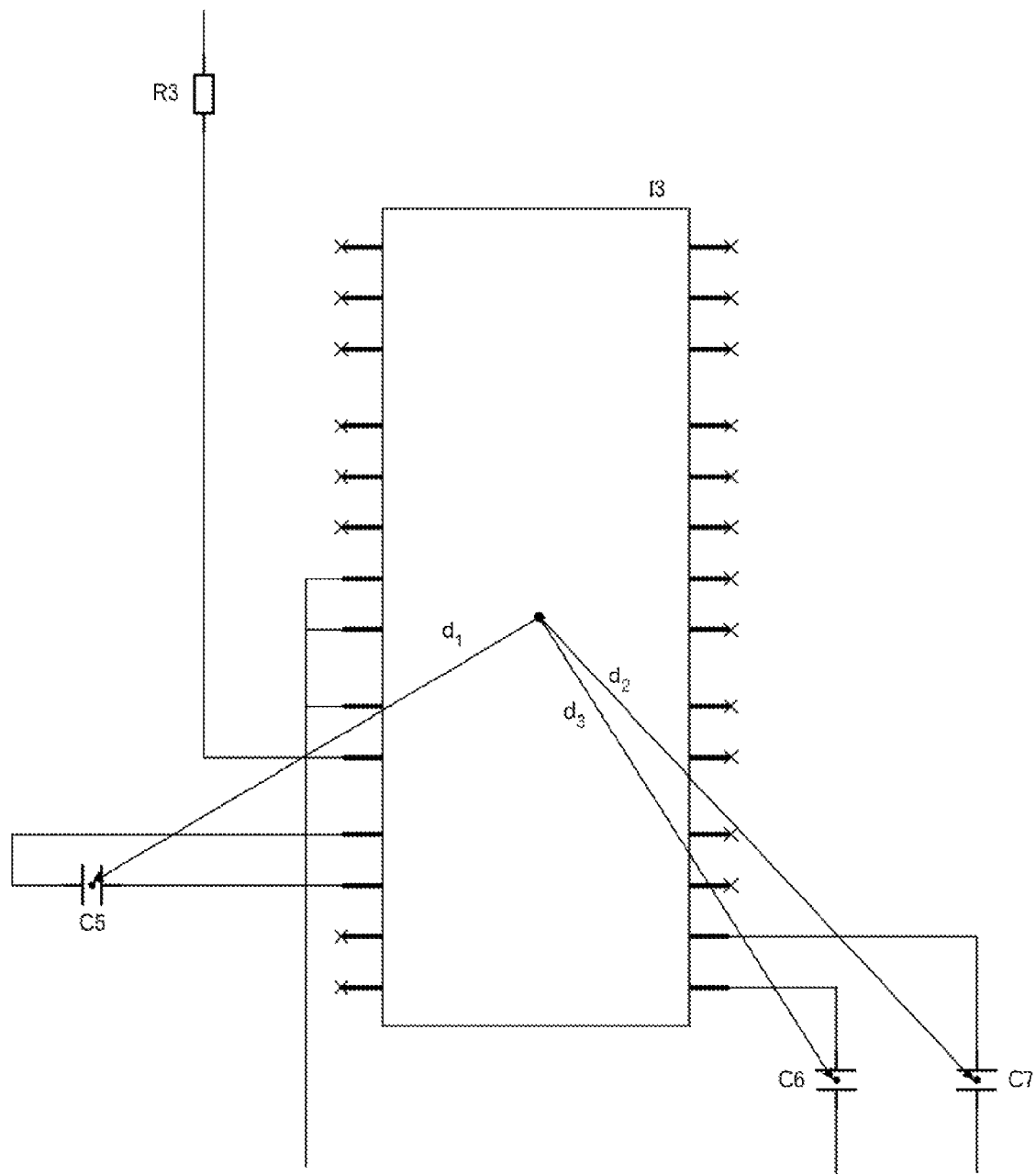
FIG. 19A is a diagram depicting an example of a circuit diagram.

Next, calculation of the relative position $C_{Rn}$ will be explained using the circuit diagram that is illustrated in FIG. 19A. Here, the index number n is taken to be 1. In the circuit diagram illustrated in FIG. 19A, component I3 is connected with each of component R3, component C5, component C6 and component C7. Moreover, it is presumed that the component I3 is identified as the reference component. In such a circuit diagram, when calculating the relative position $C_{R1}$ of the component C5 with respect to the reference component I3, first, the difference between the sheet numbers "0" is calculated, because the reference component I3 and component C5 are on the same sheet. As illustrated by arrow $d_1$ in FIG. 19A, the relative coordinates of a predetermined position on the component C5 are calculated with respect to the predetermined position of the reference component I3, which is used as a reference point. When the coordinates of the predetermined position on the reference component I3 are taken to be $(x_{I3}, y_{I3})$ and the coordinates of the predetermined position on the component C5 are taken to be $(x_{C5}, y_{C5})$, the relative coordinates $(x_{R1}, y_{R1})$ are calculated as $(x_{C5}-x_{I3}, y_{C5}-y_{I3})$. Incidentally, as for the predetermined position of the component on the circuit diagram, a predetermined one point such as the center of each component or the bottom left of each component, is used. Supposing that the reference component I3 is on a sheet whose number is 1 and component C5 is on sheet whose number is 3, the difference between the sheet numbers, which is regarded as the relative position $C_{R1}$, is calculated as 2 (=3−1). As for this difference between the sheet numbers, the absolute value of the difference between the sheet numbers may also be used.

The calculated difference between the sheet numbers and the relative position for the reference condition are registered in the data storage unit 103 as illustrated in FIG. 20, for example. The table illustrated in FIG. 20 includes a column of the difference between the sheet numbers and relative coordinates between the components relating to the reference condition, a column of the difference between the sheet numbers and relative coordinates between the components relating to the target condition, and a column of an absolute value $M_S$ of the difference between the differences between the sheet numbers and absolute value $M_L$ of the difference between the relative coordinates of the components. For example, data that is intermediately generated is held by using such a table.

After that, the corresponding component identifying unit 113 initializes an index number m for controlling the processing for the target condition, to "1" (step S65). The corresponding component identifying unit 113 then determines whether or not "m" is less than the number of records in the setting target table, which are defined in the target condition (step S67). In this embodiment, the subsequent processing is repeated (m−1) times that is equal to the number of records, which are records other than the record relating to the reference component among the records defined in the target condition. At this step, when "m" is determined to be equal to or greater than the number of records in the setting target table, which are defined in the target condition, then the processing moves to step S81 in FIG. 24 via terminal B.

On the other hand, when it is determined that "m" is less than the number of records in the setting target table, which are defined in the target condition, the corresponding component identifying unit 113 acquires, from the setting target table in the constraint condition data storage unit 107, the component $P_{Tm}$ relating to the m-th record and the component type $T_{Tm}$ of that component, and stores the acquired data in the data storage unit 103 (step S69). Here, first, the corresponding component identifying unit 113 uses the data to identify the target condition, which is stored in the data storage unit 103, to acquire the record for the target condition from the constraint condition table in the constraint condition data storage unit 107. Then, the corresponding component identifying unit 113 acquires, from the records in the setting target table, which are linked from the record for the acquired reference condition, the component ID of the component relating to the m-th record when the values registered in the column of the number are arranged in ascending order, as "$P_{Tm}$", and the component type in that record as "$T_{Tm}$", and holds them in the data storage unit 103.

The corresponding component identifying unit 113 then determines whether or not the component type $T_{Rn}$ of the component defined in the reference condition and the component type $T_{Tm}$ of the component defined in the target condition are the same (step S71). Here, it is determined whether or not the component types such as resistor, capacitor, coil or the like are the same. When it is determined that the component types are not the same, the processing moves to step S79.

On the other hand, when it is determined that the component types are the same, the corresponding component identifying unit 113 calculates the relative position $C_{Tm}$ of the $P_{Tm}$ on the circuit diagram, with respect to the reference component as a reference point, and stores the calculated result in the data storage unit 103 (step S73). Here, as for component $P_{Rn}$ and the reference component, the corresponding component identifying unit 113 uses the respective setting target IDs of the components in the setting target table as keys to search the component table in the circuit data storage unit 105, and acquires the sheet numbers and positions of the components for the pertinent records. Then, as was done at the step S63 for example, the corresponding component identifying unit 113 calculates the difference between the sheet numbers and the relative coordinates of $P_{Rn}$ with respect to the reference component as a reference point, and stores the calculated result in the data storage unit 103. It is also possible to not use the sheet number as may be done at the step S63.

Figure 19B:
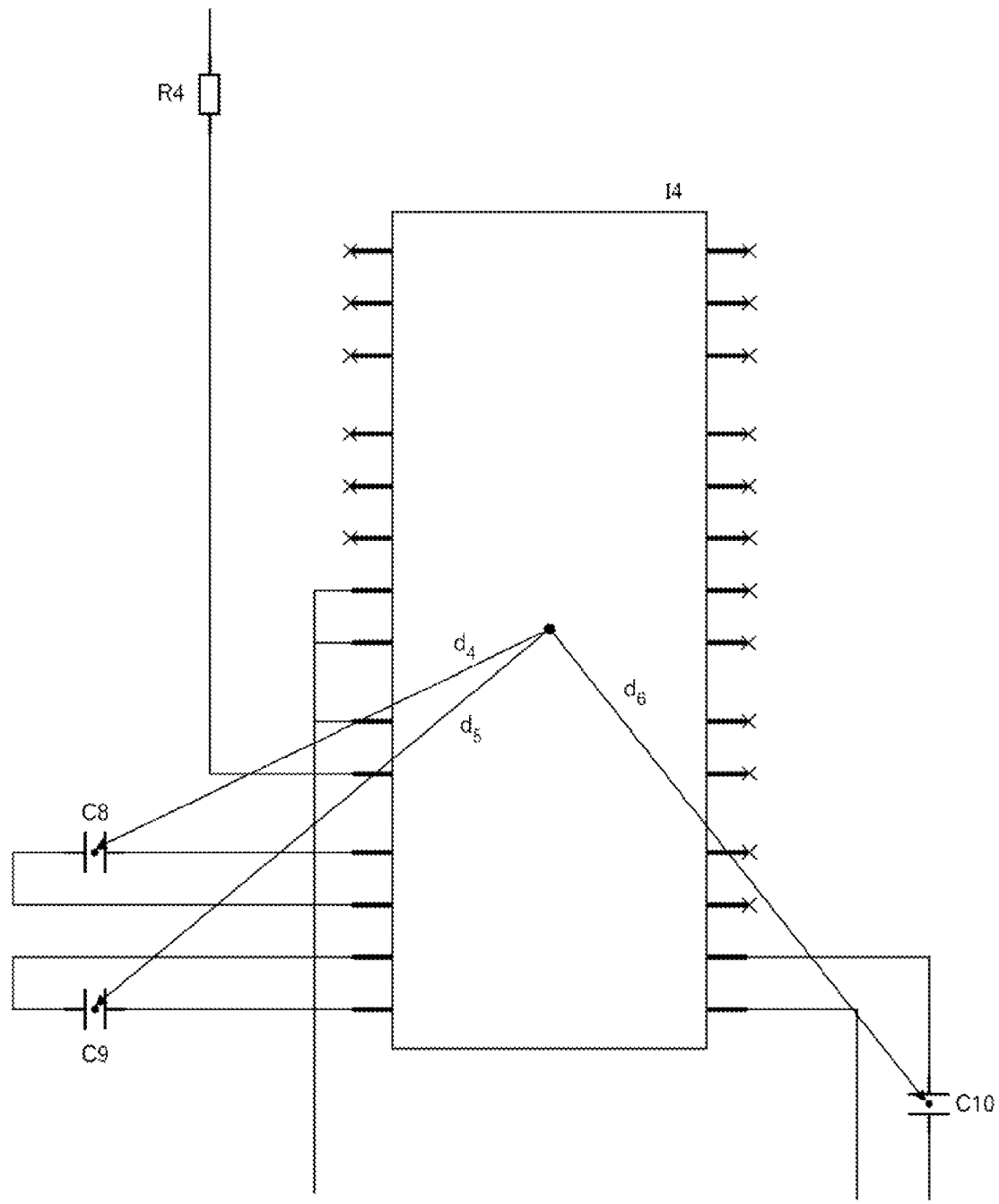
FIG. 19B is a diagram depicting an example of a circuit diagram.

For example, in the circuit diagram illustrated in FIG. 19B, it is presumed that the coordinates of the predetermined position of the reference component I4 are $(x_{I4}, y_{I4})$, the coordinates of the predetermined position of component C8 are $(x_{C8}, y_{C8})$, and the index number m is "1". In this case, the relative coordinates $(x_{T1}, y_{T1})$ of $P_{Rn}$ with respect to the reference component as a reference point are calculated to be $(x_{C8}-x_{I4}, y_{C8}-y_{I4})$. Then, for example, as illustrated in the column of the target conditions in FIG. 21, the calculated difference between the sheet numbers and relative coordinates $(x_{T1}, y_{T1})$ are registered in the data storage unit 103.

After that, the corresponding component identifying unit 113 calculates the absolute value M of the difference between the relative position $C_{Rn}$ and the relative position $C_{Tm}$, and determines whether or not the absolute value M of the difference is equal to or less than a predetermined threshold value (step S75). Here, the corresponding component identifying unit 113 calculates the absolute value of the difference between the differences between the sheet numbers, for example, as $M_S$, and calculates the absolute values of the differences between the x coordinates and between the y coordinates as $M_L$. The x coordinate and y coordinate express the position of the component on the circuit diagram. Moreover, the corresponding component identifying unit 113 reads the predetermined threshold values that are stored in the data storage unit 103 for the respective sheet number and x and y coordinates, and determines whether or not the absolute values $M_S$ and $M_L$ are equal to or less than the respective predetermined threshold values.

Moreover, it is presumed that the user sets predetermined threshold values in advance so that the threshold value for the absolute value $M_S$ of the difference is S, and the threshold values for the absolute values $M_L$ of the differences are $x_S$ and $y_S$. In the example illustrated in FIG. 19A and FIG. 19B, first the absolute value $M_S$ of the difference is calculated as 0, and the absolute values $M_L$ of the difference are calculated as $|x_{T1}-x_{R1}|$ and $|y_{T1}-y_{R1}|$. For example, as illustrated in a column of the absolute value of the difference in FIG. 22, the calculated absolute values $M_s$ of the differences and the absolute values $M_L$ of the differences are registered in the data storage unit 103. The corresponding component identifying unit 113 determines whether or not "0", which is the absolute value $M_S$ of the difference, is equal to or less than the threshold value S, whether or not $|x_{T1}-x_R|$ is equal to or less than $x_S$, and whether or not $|y_{Tm}-y_{Rn}|$ is equal to or less than $y_S$. When either of the absolute value $M_S$ of the difference and the absolute values $M_L$ of the differences is not equal to or less than the corresponding threshold value described above, the processing moves to step S79.

On the other hand, when it is determined that the absolute value $M_S$ of the difference and the absolute values $M_L$ of the differences are equal to or less than the predetermined threshold values, the corresponding component identifying unit 113 stores $P_{RN}$ as a corresponding component candidate for the component $P_{Rn}$ in the data storage unit 103 (step S77). Then, when it is determined at the step S71 that the component types are not the same, or when it is determined at the step S75 that any of the absolute values M of the differences is not equal to or less than the corresponding predetermined threshold value, or after the step S77, the corresponding component identifying unit 113 increments m by "1" (step S79), and the processing returns to the processing of the step S67. In this way, the processing of the step S67 to step S79 is repeated, and for each of the components $P_{Tm}$ other than the reference component among the components defined in the target condition, the absolute values M of the difference with the component $P_{Rn}$ relating to the reference condition obtained at the step S61 are compared to determine whether or not the component is a corresponding component.

Figure 24:
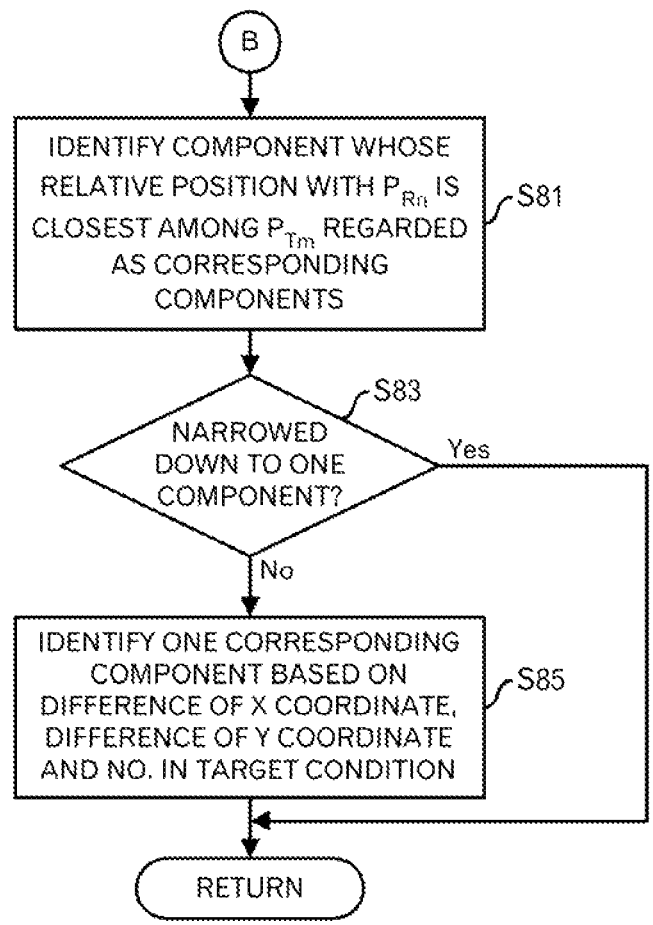
FIG. 24 is a diagram depicting a processing flow of the corresponding component extraction processing.

As was described above, when it was determined at the step S67 that m is equal to or greater than the number of records in the setting target table, which are regulated in the target condition, the processing moves to the processing in FIG. 24 via the terminal B. Then, the corresponding component identifying unit 113 narrows down, as the corresponding components, combinations of components whose Euclidian distance between the relative coordinates of the component defined in the reference condition and the relative coordinates of the component defined in the target condition is the smallest among the components stored in the data storage unit 103 as the corresponding component candidates, and stores the results in the data storage unit 103 (FIG. 24: step S81).

In the processing from the step S67 to the step S79, plural components whose absolute value M of the difference with the component defined in the reference condition is determined to be equal to or less than a threshold value among the components defined in the target condition may be held as the corresponding component candidates. At this step, the components are narrowed down to one corresponding component for one component that is defined in the reference condition.

Figure 23:
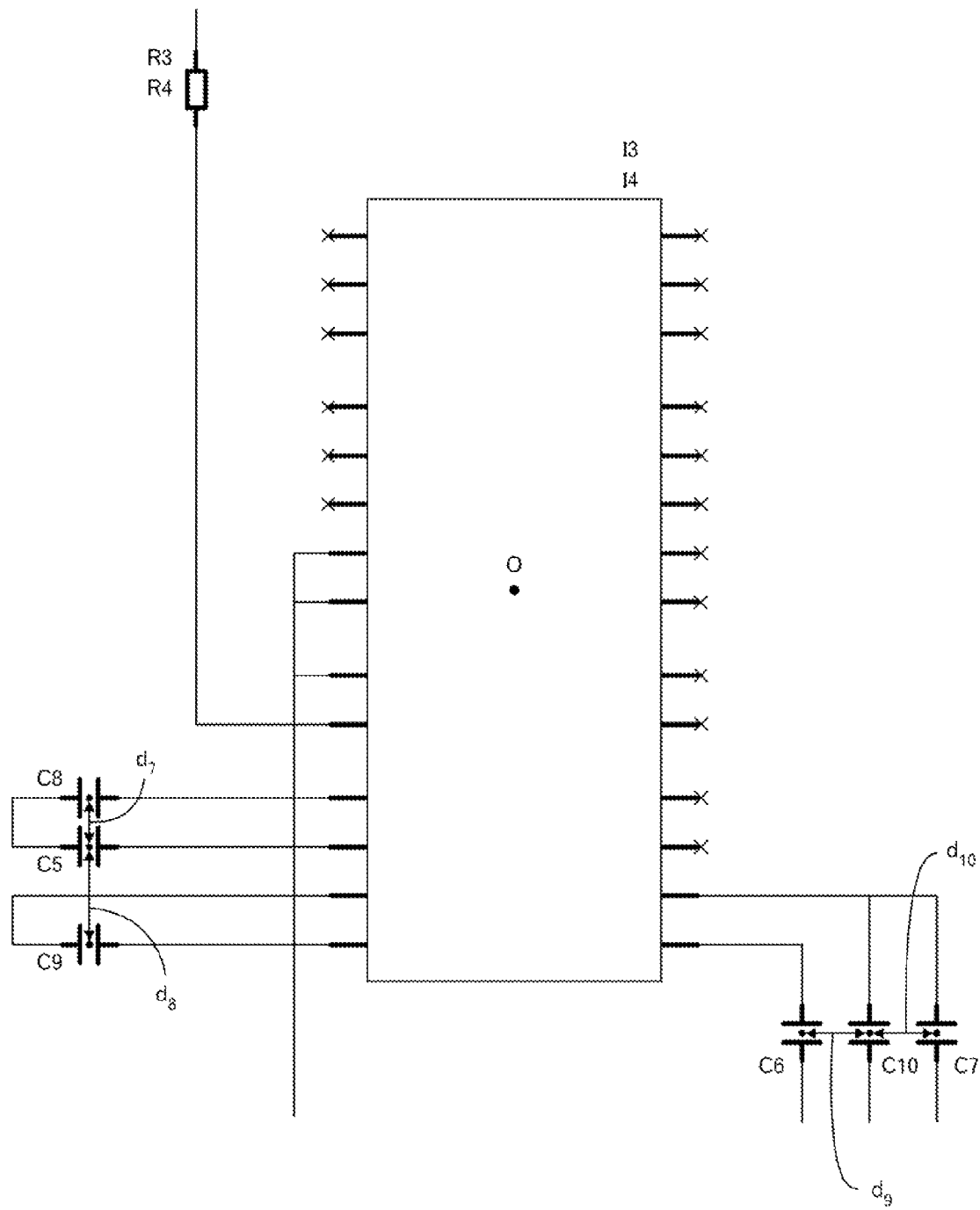
FIG. 23 is a diagram depicting an example that two circuit diagrams are superimposed.

Here, FIG. 23 illustrates a diagram in which the circuit diagrams illustrated in FIG. 19A and FIG. 19B are superimposed with a predetermined position on the reference components 13 and 14 as the center O. For example, the distance $d_7$ between the component C5 and component C8 in FIG. 23 can be calculated as $((x_{T1}-x_{R1})^2+(y_{T1}-y_{R1})^2)^{1/2}$. In FIG. 23, when component C8 and component C9 are extracted as corresponding component candidates of component C5, the component C8, which is closest to the position of the component C5, is identified from among the component C8 and component C9 as a corresponding component.

Moreover, for $P_{Tm}$ whose absolute value $M_S$ of the difference is the minimum, for example, the components may be narrowed down at this step to a component whose distance described above becomes the minimum, or the absolute value $M_S$ of the difference may be converted to a virtual distance in the Z axis direction by multiplying the absolute value $M_S$ of the difference by a predetermined coefficient, and the components may be narrowed down to a component whose distance in three-dimensional space becomes the minimum. When all of the corresponding component candidates are correlated one-on-one, each corresponding component candidate is identified as a corresponding component without carrying out the narrowing down processing at this step.

The corresponding component identifying unit 113 then determines whether or not the corresponding component candidates have been narrowed down to one (step S83). When the corresponding component candidates have been narrowed down to one, the corresponding component extraction processing ends, and the processing returns to the processing in FIG. 17. On the other hand, when there are plural corresponding component candidates, the corresponding component identifying unit 113 uses a condition for narrowing down the components, such as the difference in x coordinate or the difference in y coordinate on the circuit diagram, the value of the number defined in the target condition or the like that is set by the user in advance and stored in the data storage unit 103, and narrows down the component candidates to one corresponding component (step S85). Here, for example, for the components stored in the data storage unit 103 as corresponding component candidates, first, the differences the x coordinate of the reference component on the circuit diagram is compared to identify the component whose difference is the minimum as the corresponding component. When there is no difference in the x coordinate, the differences in y coordinate are compared in a similar manner, and the component with the minimum difference is identified as the corresponding component. When there is also no difference in the y coordinate, a component relating to the record whose value registered in the column of the number is smallest is identified among components relating to the records that correspond to corresponding component candidates in the setting target table. Incidentally, the sheet numbers are merely for convenience, and it is possible to narrow the candidates to one corresponding component by using the number in the setting target table, so the sheet numbers are not used as a condition for narrowing down candidates at this step. The corresponding component extraction processing then ends, and the processing returns to the processing in FIG. 17.

Returning to the explanation of FIG. 17, the corresponding component identifying unit 113 increments "n" by "1", after which the processing returns to the processing of the step S43. By repeating the processing from the step S43 to the step S47 in this way, a component that is defined in the reference condition is correlated with a component that is defined in the target condition.

At the step S43, when it is determined that "n" is equal to or greater than the number of records in the setting target table, which are defined in the reference condition, the corresponding component identifying unit 113 determines whether or not there are any components that are correlated with plural components defined in the reference condition, among the components defined in the target condition (step S49). In the processing from the step S43 to the step S47, there are cases where plural components that are defined in the reference condition and one component that is defined in the target condition are identified as corresponding components. At this step, when it is determined that there is a component that is correlated with the plural component defined in the reference condition, among the components defined in the target condition, the corresponding component identifying unit 113 narrows down the corresponding components that are defined in the reference condition to one component, and stores the component combination in the data storage unit 103 (step S51). Here, conditions used for narrowing down, which are set in advance by the user or the like and stored in the data storage unit 103, such as the circuit diagram coordinates, the circuit topology, the component library ID in the component library table, or the like are applied in sequence to narrow down the corresponding components.

For example, it is presumed that the component C6 and component C7 illustrated in FIG. 19A are correlated with the component C10 illustrated in FIG. 19B. In this case, when narrowing down the corresponding components using "circuit diagram coordinates" is designated, the corresponding component identifying unit 113 identifies, from among the component C6 and component C7, a component that is closest to the position of the component C10 using, as the reference points, the components I3 and I4 in the similar way as at the step S81. In other words, in FIG. 23, the corresponding component identifying unit 113 compares the distance $d_9$ from the component C10 to the component C6 with the distance $d_{10}$ to the component C7, and identifies the combination having the shortest distance between components. Similar to the processing at the step S81, it is possible to further use the absolute value $M_S$ of the difference.

When narrowing down the corresponding components using "circuit topology" is designated, the corresponding component identifying unit 113 identifies, as corresponding components, components having the same circuit topology, such as the connection relationship with the reference component (for example, whether it is directly connected with the reference component or it is connected by way of another component), component pin number or component pin attributes. Furthermore, when narrowing down the corresponding components according to the "component library ID in the component library table" is designated, the corresponding component identifying unit 113 identifies components whose component library ID are the same (in other words, components whose component characteristic values are the same) as corresponding components. Plural conditions for narrowing down components may be set with levels of the priority. In that case, narrowing down the components is carried out using these conditions in order of the priority until the corresponding components have been narrowed down to one.

After that, the corresponding component extraction processing using the circuit diagram coordinates ends, and the processing returns to the processing in FIG. 14, and moves to step S13.

By carrying out the corresponding component extraction processing using the circuit diagram coordinates in this way, correlation of components is carried out based on the circuit diagram created by the designer in the circuit design. Here, in the implementation design, there are cases where it is possible to adopt the similar wiring arrangement position on the printed circuit board between a component that is defined in a certain constraint condition and a component defined in another constraint condition. Moreover, as was described above, there is a trend for the designer to functionally group together components when placing the components on the circuit diagram, and by using a function of a CAD system, the designer may create a circuit diagram by copying and modifying similar components on the circuit diagram. Therefore, by using coordinates on the circuit diagram to correlate components having similar positional relationship, it is possible in the implementation design to identify components to which the same placement position can be applied.

Returning to the explanation of the processing in FIG. 14, when it is determined at the step S7 that the component types of the reference components are the same, the corresponding component identifying unit 113 carries out the corresponding component extraction processing using topology (step S11). This corresponding component extraction processing using topology will be explained using FIG. 25.

Figure 25:
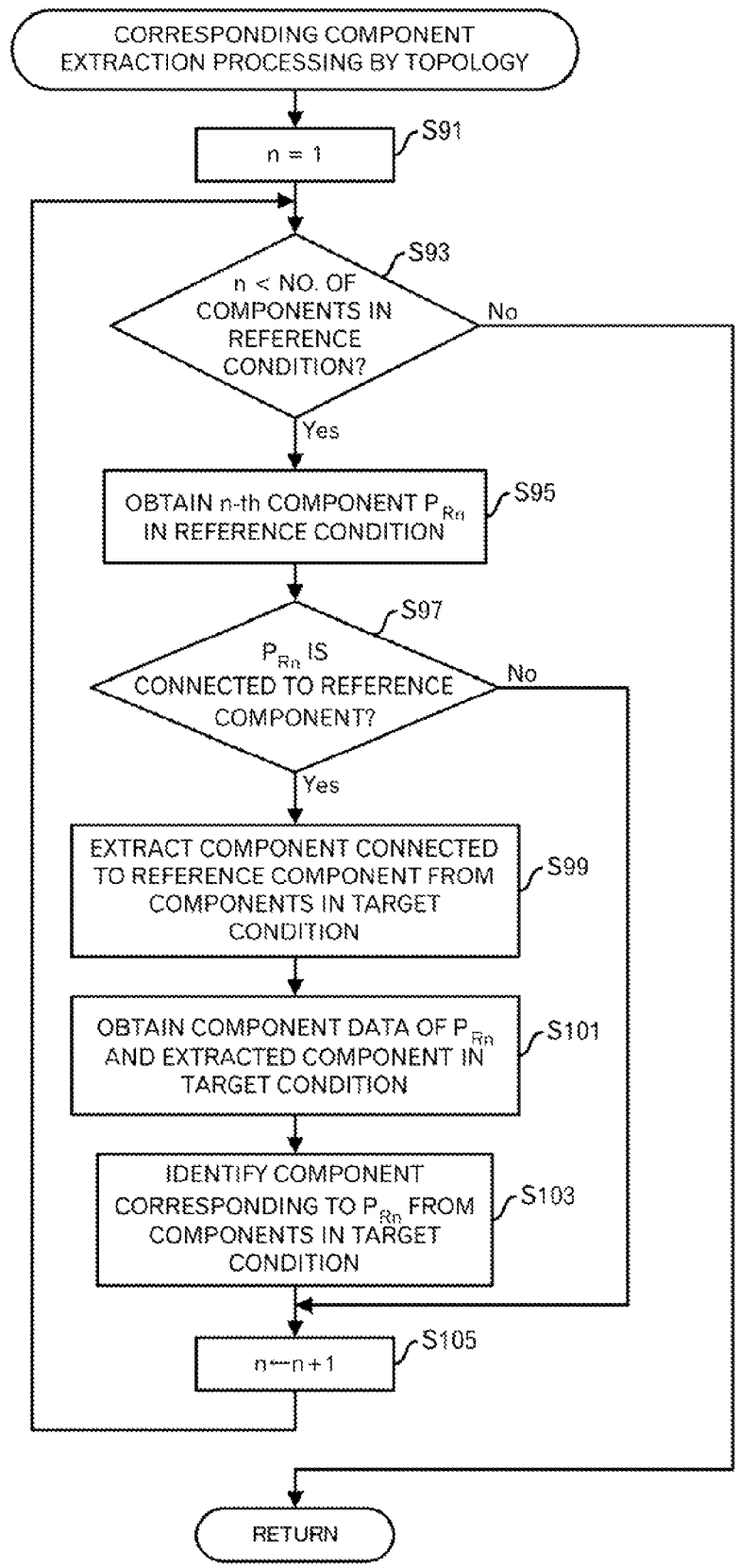
FIG. 25 is a diagram depicting a processing flow of a corresponding component extraction processing by topology.

First, the corresponding component identifying unit 113 initializes the index number "n" that is used for controlling the reference condition, to "1" (FIG. 25: step S91). Then, the corresponding component identifying unit 113 determines whether or not "n" is less than the number of records in the setting target table, which are defined in the reference condition (step S93).

When it is determined that "n" is less than the number of records in the setting target table, which are defined in the reference condition, the corresponding component identifying unit 113 acquires, as $P_{Rn}$, data for the components relating to the n-th record from among the components that are other than the reference component and are defined in the reference condition in the constraint condition data storage unit 107, and stores the acquired data in the data storage unit 103 (step S95). Here, the corresponding component identifying unit 113 first uses data to identify the reference condition, which is stored in the data storage unit 103, to acquire the record of the reference condition from the constraint condition table in the constraint condition data storage unit 107. Then, the corresponding component identifying unit 113 acquires, as $P_{Rn}$, the setting target ID of the component relating to the n-th record among the records in the setting target table, which are linked from the acquired record in the reference condition, and stores the acquired result in the data storage unit 103.

The corresponding component identifying unit 113 then determines whether or not the acquired component $P_{Rn}$ is connected to the reference component (step S97). Here, first, using the setting target ID as a key, the corresponding component identifying unit 113 identifies the pertinent record in the component table stored in the circuit data storage unit 105. The corresponding component identifying unit 113 then searches records in the component pin table and records in the link table, which are linked from the pertinent record, to determine whether or not the component $P_{Rn}$ is connected to the reference component in the reference condition. When it is determined that the component $P_{Rn}$ is not connected to the reference component, the processing moves to step S105.

On the other hand, when it is determined that the component $P_{Rn}$ is connected to the reference component, the corresponding component identifying unit 113 extracts, from among the components defined in the target condition, components that are connected to the reference component in the target condition but that are not yet correlated with a component defined in the reference condition (step S99). Here, as was done at the step S97, for components that are defined in the target condition, the corresponding component identifying unit 113 searches the component table, component pin table and link table, which are stored in the circuit data storage unit 105, to identify components that are directly connected to the reference component. The corresponding component identifying unit 113 also uses the data stored in the data storage unit 103 to determine whether or not the correlation with any of the components defined in the reference condition has been made, and extracts components that are not correlated. When a component defined in the reference condition is correlated with a component that is defined in the target condition in the subsequent processing, the combination of corresponding components is stored in the data storage unit 103.

After that, the corresponding component identifying unit 113 acquires data stored in the component library data storage unit 111 for each of the component $P_{Rn}$ that was acquired at the step S95 and the components extracted at the step S99 (step S101). Here, the corresponding component identifying unit 113 acquires conditions for correlation such as the component type of components defined in the target condition, component pin information (component pin number and attributes) of the component pins connected to the reference component among the component pins of that components, component library ID and the like, which are set in advance by the user or the like, and stored in the data storage unit 103.

The corresponding component identifying unit 113 then identifies a component corresponding to the component $P_{Rn}$ from the components extracted at the step S99, and stores the combination of corresponding components in the data storage unit 103 (step S103). Here, for example, the corresponding component identifying unit 113 determines, for the components defined in the reference condition and the components defined in the target condition, whether the number of a component pin connected to the reference component is the same, whether the attributes of a component pin connected to the reference component are the same, whether the component type of the component itself is the same, and furthermore, whether the component library IDs are the same (whether the characteristic values of the components are the same), and when there is such a component, the corresponding component identifying unit 113 identifies that component as a corresponding component. In the case where there are plural components that correspond to these conditions, one component having the smallest number in the setting target table is correlated.

The corresponding component identifying unit 113 then increments the index number "n" by "1" (step S105), and the processing returns to the processing of the step S93. By repeating the processing from the step S93 to the step S105, components defined in the reference condition and components defined in the target condition are correlated. Then, when it is determined at the step S93 that "n" is equal to or greater than the number of records in the setting target table, which are defined in the reference condition, the corresponding component extraction processing using topology ends, and the processing returns to the processing in FIG. 14.

By carrying out the corresponding component extraction processing using topology in this way, it is also possible to correlate components based on the circuit diagram data. There is also a possibility that components having similar circuit topology, such as the connection relationship between components, and component types and characteristic values of connected components, can be placed similarly on the printed circuit board. Therefore, even by correlating components based on the circuit topology, it is possible to identify components for which the similar placement position can be adopted in the implementation design.

Returning to the explanation of the processing in FIG. 14, after the step S9 or the step S11, the corresponding component identifying unit 113 reads data concerning the component correlation from the data storage unit 103, and sets the same value in the column of the number in the setting target table for the correlated components (step S13). Here, for example, the number of the component that is defined in the target condition is matched with the number of the component that is defined in the reference condition. When there are no corresponding components, a missing number may occur.

For example, in FIG. 19A and FIG. 19B, presuming that component C5 and component C8 are correlated, and that component C7 and component C10 are correlated, the same number 2 as component C5 is set in the column of the number for the component C8 in the setting target table (FIG. 11), and the same number 4 as the component C7 is set in the column of the number for the component C10. When corresponding components are not identified for the component C6 and component C9, a number is assigned to the column of the number for the component C9 in the setting target table so that the assigned number does not duplicate the numbers of the components defined in the reference condition. By carrying out such a processing, it is possible to identify the correlation between the components from data created in the circuit design.

Then, the display unit 117 displays the data that is stored in the constraint condition data storage unit 107 (step S15). For example, after the correlation of the numbers at the step S13, the display unit 117 displays the component that is defined in the reference condition and the component that is defined in the target condition.

Figures 26, 28:
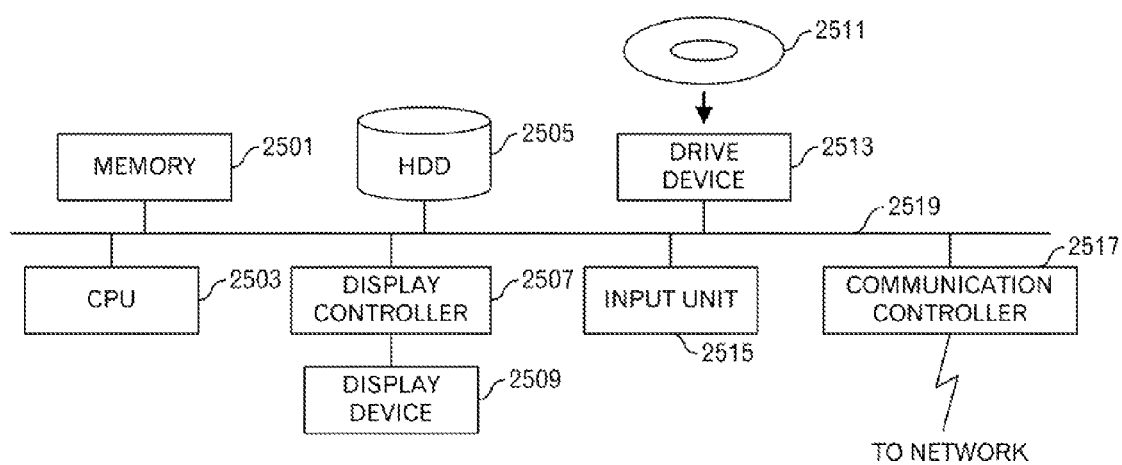
FIG. 26 is a diagram depicting an example of display of components.
FIG. 28 is a functional block diagram of a computer.

In the case of the data for the components illustrated in FIG. 19A and FIG. 19B, data such as illustrated in FIG. 26 is displayed. In the table illustrated in FIG. 26, by using the setting target names, setting target IDs and numbers, which are registered in the setting target table, the data relating to the reference condition and the data relating to the target condition are arranged side-by-side, and the data of the components defined in the respective conditions are arranged in ascending order of values registered in the column of the number. Component C5 and component C8 are displayed in the line for the number 2, and component C7 and component C10 are displayed in the line for the number 4. Components that correspond to other constraint conditions are not displayed for component C6 and component C9. By displaying components that are defined in one constraint condition in the vertical direction, and displaying corresponding components in the horizontal direction, it is easy for the user to know the correlation between component groups.

The output unit 115 then outputs netlist data and constraint condition data that includes data about correlated components from the circuit data storage unit 105 and constraint condition data storage unit 107 to a terminal of the implementation designer or to the data storage unit 103 of the information processing apparatus 1 (step S17). Components defined in the constraint conditions are already correlated, so by using such data in the implementation design, applying the same placement position for similar components becomes easier. In the case that it is possible to read circuit diagram data that was created in the circuit design, in the implementation design, the processing of this embodiment may be carried out during the implementation design stage.

Before the step S17, for example, the processing may be such that it is possible for the user to change the order of components in the table such as illustrated in FIG. 26, or to be such that it is possible to change the correlation between components. For example, in the table illustrated in FIG. 26, the order of selected components may be moved in the vertical direction, or the order can be changed by dragging selected components, or plural selected components may be sorted into alphabetical order. By doing so, after the processing of this embodiment has been completed, it becomes possible for the user to check the results and make minor modifications.

As illustrated in FIG. 27, for example, it is also possible to correlate a component that is defined in one reference condition with a component that is defined in plural target conditions. In the example in FIG. 27, components relating to three constraint conditions are illustrated, with the constraint condition on the left, for example, taken to be the reference condition. In this case, first, in the reference component identifying processing, reference components are identified from the components defined in each of the target conditions. Then, in the corresponding component processing using circuit diagram coordinates, or corresponding component processing using topology, it is determined whether or not there are corresponding components among the components defined in the reference condition, and the components defined in each of the target conditions. The processing may be carried out in order for each of the target conditions, or may be carried out in parallel.

It is also possible to identify corresponding components using both of the algorithms for the corresponding component extraction processing using circuit diagram coordinates, and the corresponding component extraction processing using topology, and when there is a difference in the results, the user may be notified so as to recognize the difference.

In the corresponding component extraction processing using the circuit diagram, corresponding component candidates are extracted in the processing from the step S67 to the step S79, and one corresponding component is identified from among those candidates in the processing from the step S81 to the step S85, however, it is also possible to identify one corresponding component from the start by applying the conditions used at the step S75, step S81 and step S85 in order. Moreover, when correlation is dropped at the step S51, it is possible to carry out correlation of corresponding component candidates again with components defined in the reference condition.

Although the embodiments of this technique were explained, this technique is not limited to these embodiments. For example, the functional block diagram is a mere example, and does not always correspond to an actual program module configuration. Moreover, as long as the processing results do not change, the order of the steps in the processing flow may be exchanged, and the steps may be executed in parallel. Furthermore, the aforementioned functions may be realized not only in one computer but also plural computers.

In addition, the aforementioned information processing apparatus 1 is a computer device as shown in FIG. 28. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are summarized as follows:

An information processing method relating to the embodiments includes: (A) identifying a first reference component from among first components defined in a first constraint condition that is a reference designated from among constraint conditions, which are stored in a condition storage unit, regarding a position relationship between plural components on a printed circuit board; (B) identifying a second reference component from among second components defined in a second constraint condition that is to be compared with the first constraint condition and included in the constraint conditions; and (C) identifying a fourth component that is a component other than the second reference component among the second components and has a correspondence with a third component, based on position relationships with the third component and an attribute of the third component, wherein the third component is a component other than the first reference component among the first components.

First, components for which the similar displacement position on the printed circuit board can be adopted according to position relationships between components defined in one constraint condition may exist among components defined in another constraint condition regarding the position relationship between plural components on the printed circuit board. Then, when carrying out the aforementioned processing, the aforementioned fourth component, for which the similar displacement position can be adopted on the printed circuit board, can be identified. Because the similar displacement can be applied in the implementation design, when the components that have such a correspondence are identified, it is possible to reduce the burden of the work on the designer.

Moreover, the third identifying may include: (b1) obtaining displacement coordinates of the first reference component, the third component, the second reference component and fifth components that are components other than the second reference component among the second components, from circuit diagram data including displacement coordinates of components defined in a circuit diagram and being stored in a circuit diagram data storage unit; (b2) obtaining component types of the third component and the fifth components from component data including component types of the components defined in a circuit diagram and being stored in a component data storage unit; and (b3) extracting, from the fifth components, the fourth component that is a component, which has a same component type as the third component and whose difference between a distance, which is based on the displacement coordinates, between the first reference component and the third component and a distance, based on the displacement coordinates, with the second reference coordinates is shortest. By doing so, the aforementioned component can be identified based on the component type and the coordinates on the circuit diagram. The designer tends to define components, which are included in a similar circuit, in a similar layout in the circuit diagram. Moreover, the designer may create the circuit diagram by copying data of the similar circuit in a CAD system. Therefore, when the correspondence can be extracted with the coordinates in the circuit diagram and the component types, the possibility of the component for which the similar displacement position can be adopted on the printed circuit board is high.

Then, the third identifying may include: (b3) extracting a sixth component that is a component connected with the first reference component among components identified by excluding the first reference component from the first components, and seventh components that are components connected with the second reference component among components identified by excluding the second reference component from the second components, based on first data representing connection relationships with the first reference component and the second reference component, wherein the first data is included in data representing connection relationships of components defined in a circuit diagram, and the data is stored in the circuit diagram data storage unit; (b4) extracting first component data concerning the sixth component and second component data concerning the seventh components from components data including at least either of a component type, a characteristic value of a component, a number of a component pin and an attribute of the component pin, wherein the component data is stored in a component data storage unit; and (b5) identifying the fourth component from among the seventh components, wherein the fourth component is a component whose second component data at least partially coincides with at least a portion of the first component data. Thus, the aforementioned fourth component can be identified based on data (i.e. circuit topology) of the component having the connection relationship with the reference component. When the component has such a relationship, the possibility of the component, for which the similar displacement position can be adopted, is high.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:

first identifying a first reference component from among a plurality of first components defined in a first constraint condition that is a reference designated from among constraint conditions regarding a position relationship between a plurality of components on a printed circuit board;

second identifying a second reference component from among a plurality of second components defined in a second constraint condition that is a target of comparison with the first constraint condition, included in the constraint conditions, and different from the first constraint condition, wherein the plurality of first components are different from the plurality of second components; and third identifying a fourth component that is a component other than the second reference component among the plurality of second components defined in the second constraint condition and has a correspondence with a third component, based on an attribute of the third component and a positional relationship between the first reference component and the third component, wherein the third component is a component other than the first reference component among the plurality of first components defined in the first constraint condition.

2. The computer-readable, non-transitory storage medium as set forth in claim 1, wherein the third identifying comprises:
   obtaining displacement coordinates of the first reference component, the third component, the second reference component and fifth components that are components other than the second reference component among the plurality of second components, from circuit diagram data including displacement coordinates of components defined in a circuit diagram;
   obtaining component types of the third component and the fifth components from component data including component types of the components defined in a circuit diagram; and
   extracting, from the fifth components, the fourth component that is a component, which has a same component type as the third component and whose difference between a distance, which is based on the displacement coordinates, between the first reference component and the third component and a distance, based on the displacement coordinates, with the second reference coordinates is shortest.

3. The computer-readable, non-transitory storage medium as set forth in claim 1, wherein the third identifying comprises:
   extracting a sixth component that is a component connected with the first reference component among components identified by excluding the first reference component from the plurality of first components, and seventh components that are components connected with the second reference component among components identified by excluding the second reference component from the plurality of second components, based on first data representing a connection relationship of the first reference component and a connection relationship of the second reference component, wherein the first data is included in data representing connection relationships of components defined in a circuit diagram;
   extracting first component data concerning the sixth component and second component data concerning the seventh components from components data including at least either of a component type, a characteristic value of a component, a number of a component pin and an attribute of the component pin; and
   identifying the fourth component from among the seventh components, wherein the fourth component is a component whose second component data at least partially coincides with at least a portion of the first component data.

4. An information processing method comprising:
   first identifying, by using a computer, a first reference component from among a plurality of first components defined in a first constraint condition that is a reference designated from among constraint conditions regarding a position relationship between a plurality of components on a printed circuit board;
   second identifying, by using the computer, a second reference component from among a plurality of second components defined in a second constraint condition that is a target of comparison with the first constraint condition, included in the constraint conditions, and different from the first constraint condition, wherein the plurality of first components are different from the plurality of second components; and
   third identifying, by using the computer, a fourth component that is a component other than the second reference component among the plurality of second components defined in the second constraint condition and has a correspondence with a third component, based on an attribute of the third component and a positional relationship between the first reference component and the third component, wherein the third component is a component other than the first reference component among the plurality of first components defined in the first constraint condition.

5. The information processing method as set forth in claim 4, wherein the third identifying comprises:
   obtaining displacement coordinates of the first reference component, the third component, the second reference component and fifth components that are components other than the second reference component among the plurality of second components, from circuit diagram data including displacement coordinates of components defined in a circuit diagram;
   obtaining component types of the third component and the fifth components from component data including component types of the components defined in a circuit diagram; and
   extracting, from the fifth components, the fourth component that is a component, which has a same component type as the third component and whose difference between a distance, which is based on the displacement coordinates, between the first reference component and the third component and a distance, based on the displacement coordinates, with the second reference coordinates is shortest.

6. The information processing method as set forth in claim 4, wherein the third identifying comprises:
   extracting a sixth component that is a component connected with the first reference component among components identified by excluding the first reference component from the plurality of first components, and seventh components that are components connected with the second reference component among components identified by excluding the second reference component from the plurality of second components, based on first data representing a connection relationship of the first reference component and a connection relationship of the second reference component, wherein the first data is included in data representing connection relationships of components defined in a circuit diagram;
   extracting first component data concerning the sixth component and second component data concerning the seventh components from components data including at least either of a component type, a characteristic value of a component, a number of a component pin and an attribute of the component pin; and
   identifying the fourth component from among the seventh components, wherein the fourth component is a component whose second component data at least partially coincides with at least a portion of the first component data.

7. An information processing apparatus comprising;
   a memory; and
   a processor configured to use the memory and execute a procedure comprising:
      first identifying a first reference component from among a plurality of first components defined in a first constraint condition that is a reference designated from among constraint conditions regarding a position relationship between a plurality of components on a printed circuit board;
      second identifying a second reference component from among a plurality of second components defined in a second constraint condition that is a target of comparison with the first constraint condition, included in the constraint conditions, and different from the first constraint condition, wherein the plurality of first components are different from the plurality of second components; and third identifying a fourth component that is a component other than the second reference component among the plurality of second components defined in the second constraint condition and has a correspondence with a third component, based on an attribute of the third component and a positional relationship between the first reference component and the third component, wherein the third component is a component other than the first reference component among the plurality of first components defined in the first constraint condition.

8. The information processing apparatus as set forth in claim 7, wherein the third identifying comprises:

obtaining displacement coordinates of the first reference component, the third component, the second reference component and fifth components that are components other than the second reference component among the plurality of second components, from circuit diagram data including displacement coordinates of components defined in a circuit diagram;

obtaining component types of the third component and the fifth components from component data including component types of the components defined in a circuit diagram; and extracting, from the fifth components, the fourth component that is a component, which has a same component type as the third component and whose difference between a distance, which is based on the displacement coordinates, between the first reference component and the third component and a distance, based on the displacement coordinates, with the second reference coordinates is shortest.

9. The information processing apparatus as set forth in claim 7, wherein the third identifying comprises:

extracting a sixth component that is a component connected with the first reference component among components identified by excluding the first reference component from the plurality of first components, and seventh components that are components connected with the second reference component among components identified by excluding the second reference component from the plurality of second components, based on first data representing a connection relationship of the first reference component and a connection relationship of the second reference component, wherein the first data is included in data representing connection relationships of components defined in a circuit diagram;

extracting first component data concerning the sixth component and second component data concerning the seventh components from components data including at least either of a component type, a characteristic value of a component, a number of a component pin and an attribute of the component pin; and identifying the fourth component from among the seventh components, wherein the fourth component is a component whose second component data at least partially coincides with at least a portion of the first component data.

* * * * *